United States Patent
Nakagata et al.

(10) Patent No.: US 9,014,418 B2
(45) Date of Patent: Apr. 21, 2015

(54) DIGITAL WATERMARK EMBEDDING APPARATUS AND METHOD, AND DIGITAL WATERMARK DETECTING APPARATUS AND METHOD

(71) Applicant: Fujitsu Limited, Kawasaki-shi (JP)

(72) Inventors: Shohei Nakagata, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 239 days.

(21) Appl. No.: 13/659,490

(22) Filed: Oct. 24, 2012

(65) Prior Publication Data

US 2013/0136296 A1 May 30, 2013

(30) Foreign Application Priority Data

Nov. 29, 2011 (JP) ................... 2011-261051

(51) Int. Cl.
*G06K 9/00* (2006.01)
*G06T 1/00* (2006.01)
*H04L 9/08* (2006.01)
*H03M 13/09* (2006.01)
*H03M 13/11* (2006.01)
*H03M 13/15* (2006.01)

(52) U.S. Cl.
CPC .......... *G06T 1/005* (2013.01); *G06T 2201/0063* (2013.01); *H03M 13/09* (2013.01); *H03M 13/11* (2013.01); *H03M 13/1515* (2013.01); *H04L 9/0869* (2013.01); *H04L 2209/608* (2013.01)

(58) Field of Classification Search
USPC ......................................... 382/100
See application file for complete search history.

(56) References Cited

U.S. PATENT DOCUMENTS

| 2003/0091213 A1* | 5/2003 | Yamakage et al. | 382/100 |
| 2004/0258243 A1* | 12/2004 | Shin et al. | 380/210 |
| 2006/0115112 A1* | 6/2006 | Yeung et al. | 382/100 |
| 2006/0236112 A1* | 10/2006 | Maeno | 713/176 |
| 2012/0163583 A1* | 6/2012 | Nakagata et al. | 380/28 |

FOREIGN PATENT DOCUMENTS

| JP | 2007-178857 | 7/2007 |
| JP | 2007-324720 | 12/2007 |

OTHER PUBLICATIONS

Dan Boneh, et al., "Collusion-Secure Fingerprinting for Digital Data," IEEE Transactions on Information Theory, vol. 44, No. 5 (Sep. 1988), pp. 1897-1905.

Gábor Tardos, et al., "Optimal Probabilistic Fingerprint Codes," Rényi Institute, Hungarian Academy of Sciences, Pf. 127, H-1354 Budapest, Hungary (2003), pp. 116-125.

\* cited by examiner

*Primary Examiner* — Alex Liew
(74) *Attorney, Agent, or Firm* — Fujitsu Patent Center

(57) ABSTRACT

A digital watermark embedding apparatus is disclosed. A first codeword including a bit sequence of digital watermark information is generated. A cyclic shift sequence is generated based on the digital watermark information. A second codeword is generated by cyclically shifting the first codeword based on the generated cyclic shift sequence. The generated second codeword is embedded in contents.

9 Claims, 18 Drawing Sheets

FIG.14
CYCLIC SHIFT SEQUENCE
S[0], S[1], S[2], ⋯ S[N−1]
⬇ SEARCH FOR PORTION MATCHING
   WITH RANDOM NUMBER SEQUENCE
R[0], R[1], R[2], ⋯ ⋯ R[i], ⋯ ⋯ R[nw−1]
⬇ GENERATE CANDIDATES
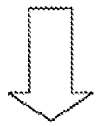
w[0] ⟶ W[0]
w[1] ⟶ W[1]
w[2] ⟶ W[2]
⋮            ⋮
w[$N_w$−1] ⟶ W[$N_w$−1]
CONVERT INTO MODIFIED
WATERMARK INFORMATION

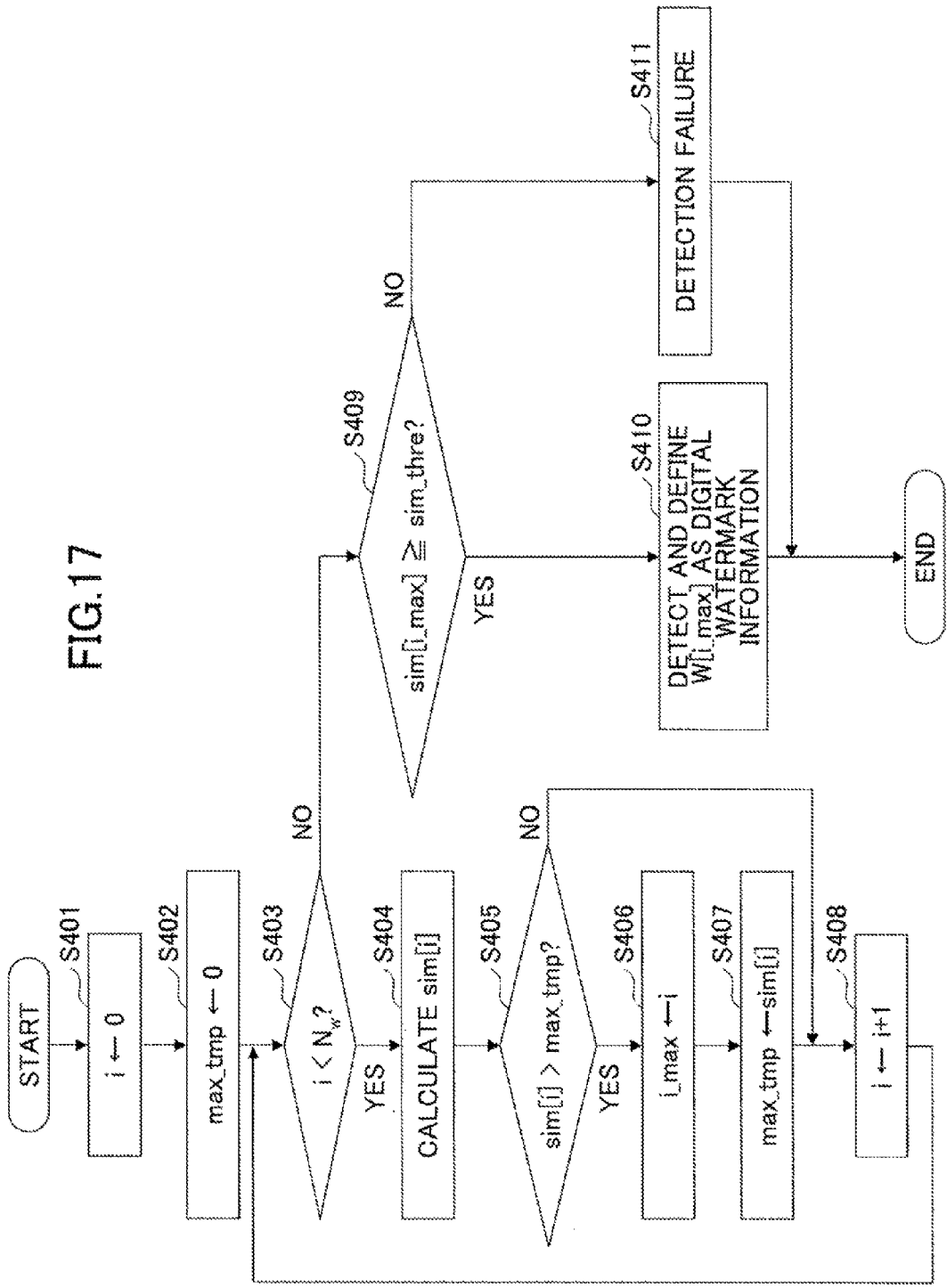

US 9,014,418 B2

DIGITAL WATERMARK EMBEDDING APPARATUS AND METHOD, AND DIGITAL WATERMARK DETECTING APPARATUS AND METHOD

CROSS-REFERENCE TO RELATED APPLICATIONS

This patent application is based upon and claims the benefit of priority of the prior Japanese Patent Application No. 2011-261051 filed on Nov. 29, 2011, the entire contents of which are incorporated herein by reference.

FIELD

The embodiment discussed herein is related to a digital watermark embedding apparatus and method, and a digital watermark detecting apparatus and method which use digital watermark information with respect to digitalized contents.

BACKGROUND

A digital watermark is regarded as a technology for embedding additional information which a person is not aware of, with respect to image data and sound data. By embedding copyright information contents and purchase information of a user, it is possible to specify the presence or absence of the copyright information and the originator of the leak when the contents are illegally leaked.

Also, in a case in which an image and movie contents are the targets to embed the digital watermark, the digital watermark may be applied to a digital signage. By detecting the digital watermark by a mobile phone or the like with a camera from a movie advertisement displayed at a street screen or a television set, it is possible to acquire additional detailed information and the like of a product.

The contents, in which the digital watermark is embedded, may be degraded after compression and cutting of data, a filtering process, and the like. Thus, it is preferable to have prevention with respect to conceivable degradation factors. Exceptionally, in a case of using the digital watermark in the purpose of copyright protection, the contents, in which the digital watermark is embedded, are preferred to be capable of preventing attacks by a malicious user, the attacks which analyze and invalidate the digital watermark.

These attacks are called "collusion attacks". The "collusion attacks" are regarded as attacks in which multiple users bring their contents in which the digital watermark is embedded and compare portions where data are different, so that a targeted digital watermark is analyzed and invalidated.

As a typical collusion attack, an averaging attack is known. In the averaging attack, the target contents are attacked by averaging multiple contents including the digital watermark and generating new contents in which the digital watermark is degraded. It is assumed that there is a digital watermark indicating a bit "0" at a location in the contents of a user A and there is a digital watermark indicating a bit "1" at the same location in the contents of a user B. In a case in which two users collude with each other to perform the averaging attack, the bit "0" of the user A and the bit "1" of the user B at the location are averaged, and the digital watermark at the location is erased.

As described above, users colluding with each other target the location in the contents in which watermark information is different. In general, the more users who collude with each other, the wider success of the attack. The following two technologies are known as related arts to resist the collusion attack described above.

A first technology is related to embedding the digital watermark using collusion-secure codes. In this technology, codes (c-secure with $\epsilon$ error) are presented, so-called "collusion-secure codes", in which probability for erroneously detecting a user who does not collude becomes $\epsilon$ in a case of c users colluding with each other.

A code length to generate the collusion secure code is conceptually indicated to be an order of c (counts of users) raised to the fourth power ($c^4$). Also, there is a technology to realize the collusion-secure codes by the code length which is an order of c raised to the second power ($c^2$). There are approaches to reduce code length of the collusion-secure codes.

A second technology is related to embedding the digital watermark in which watermark data are diffused by a key in a different method for each user. In this technology, it is realized to diffuse the watermark data by scrambling based on the key. The digital watermark being embedded is detected by restoring data which are diffused by the key used to embed the digital watermark. In a case of the collusion attack, it is possible to conduct a random noise for the watermark information of the user which does not correspond to the key when the digital watermark is detected. Thus, it is possible to realize watermark embedding having the collusion secure.

Patent Documents

Japanese Laid-open Patent Publication No. 2007-178857
Japanese Laid-open Patent Publication No. 2007-324720

Non-Patent Documents

D. Boneh and J. Shaw, "Collusion-Secure Fingerprinting for Digital Data," IEEE TRANSACTIONS ON INFORMATION THEORY, VOL. 44, NO. 5, SEPTEMBER 1998, pp. 1897-1905
Tarodos, G. "Optimal Probabilistic Fingerprinting Codes." In:STOC '03, ACM(2003) pp. 116-125

SUMMARY

According to one aspect of the embodiment, there is provided a digital watermark embedding apparatus, including a codeword generation part configured to generate a first codeword including a bit sequence of digital watermark information; a shift sequence generation part configured to generate a cyclic shift sequence based on the digital watermark information; a shifting part configured to generate a second codeword by cyclically shifting the first codeword based on the cyclic shift sequence generated by the shift sequence generation part; and an embedding part configured to embed the second codeword generated by the shifting part.

According to another aspect of the embodiment, there is provided a digital watermark detecting apparatus, including a codeword detection part configured to detect, from contents of a watermark detection target, a first detection code including multiple second codewords each of which is generated by cyclically shifting a first codeword, which includes digital watermark information, by using a cyclic shift sequence generated based on the digital watermark information; a shift sequence detection part configured to perform a process for detecting, with respect to one second codeword, multiple shift amounts by calculating a cross-correlation value in response to a cyclic shift to other second codewords, and for updating the one second codeword by accumulating the other second codewords, which are reversely shifted by the shift amount, and the one second codeword, in which the process is conducted for each of the other second codewords; a candidate generation part configured to generate digital watermark information candidates from a shift sequence in which the multiple shift amounts are aligned; and a matching part configured to detect the digital watermark information embedded in the contents based on similarity between each of the digital watermark information candidates and the one accumulated second codeword which is generated in the shift sequence detection part.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 14 is a diagram for explaining generation of digital watermark information candidates;

FIG. 17 is a flowchart for explaining an example of a process conducted by a watermark information matching part.

DESCRIPTION OF EMBODIMENTS

In the following, embodiments of the present invention will be described with reference to the accompanying drawings.
[First Embodiment]
<Configuration>

Figure 1:
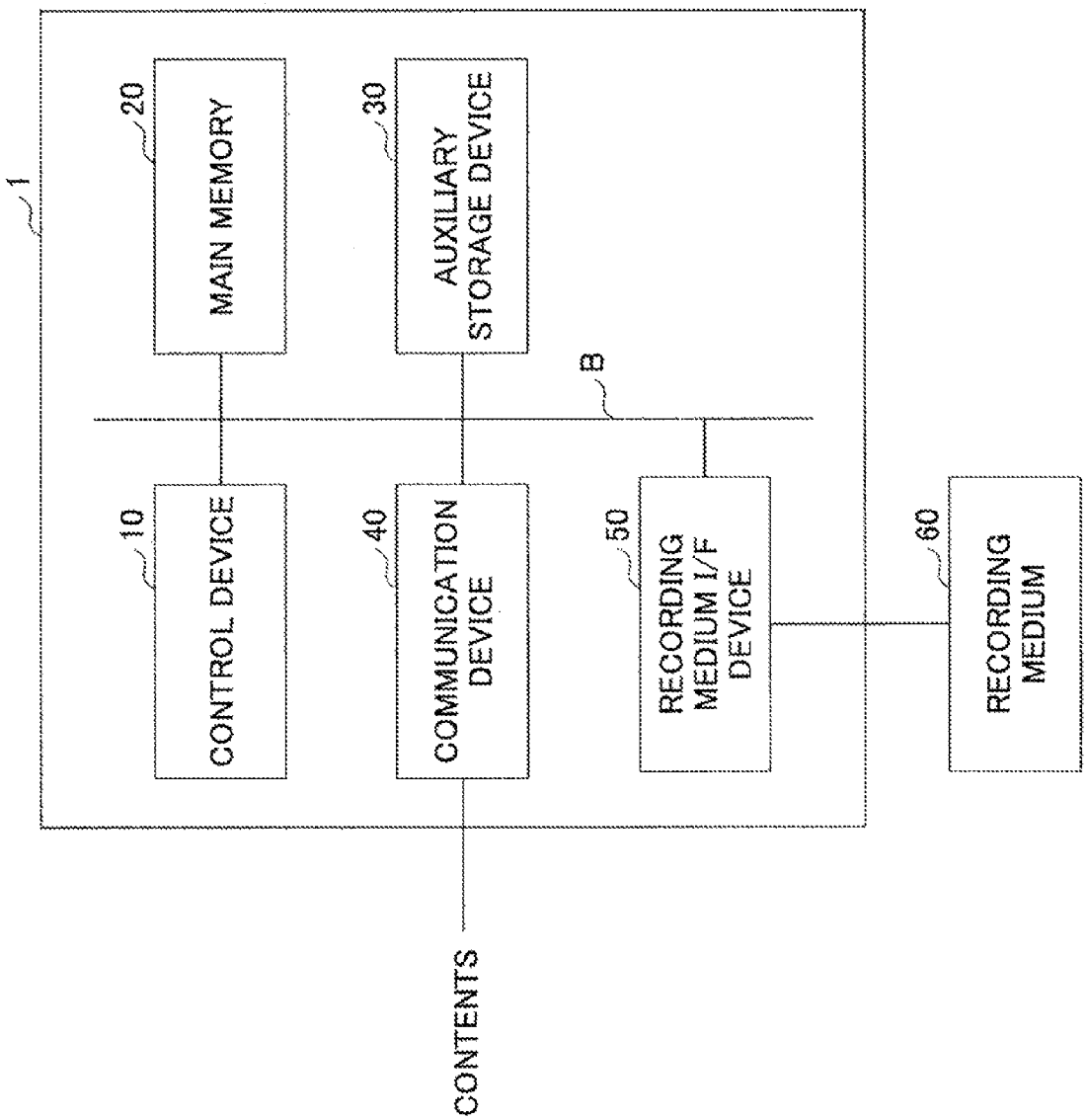
FIG. 1 is a diagram illustrating an example of a configuration of an information processing apparatus.

FIG. 1 is a diagram illustrating an example of a configuration of an information processing apparatus 1. The information processing apparatus 1 illustrated in FIG. 1 functions as a digital watermark embedding apparatus for embedding digital watermark information. The information processing apparatus 1 illustrated in FIG. 1 includes a processor such as a control device 10, a main memory 20, an auxiliary storage device 30, a communication device 40, and a recording medium interface (I/F) device 50. The devices 10, 20, 30, 40, and 50 are mutually connected via a bus B to receive and send data.

In a computer, the control device 10 corresponds to a Central Processing Unit (CPU) for controlling each of devices 20, 30, 40, and 50, calculating and processing data, and the like. Moreover, the control device 10 is a calculation apparatus for executing programs stored in the auxiliary storage device 30. The control device 10 receives data from the communication device 40, the main memory 20, or the auxiliary storage device 30, calculates and processes the data, and outputs the data to an output part, the main memory 20, or the auxiliary storage device 30.

Moreover, the control device 10 realizes a role of the digital watermark embedding function by executing a program for embedding the digital watermark information stored in the auxiliary storage part 30.

The main memory 20 includes a Read-Only Memory (ROM), a Random Access Memory (RAM), or the like. The main memory 20 may be regarded as a storage device for storing or temporarily storing programs such as an Operating System (OS) being basic software, application software, and the like which are executed by the control device 20, and data.

The auxiliary storage part 30 includes a Hard Disk Drive (HDD), and stores data related to the application software. In the auxiliary storage part 30, the digital watermark information stores digitalized contents such as movies, music, or the like acquired from the communication part 40.

Moreover, the auxiliary storage device 30 may store the contents, the digital watermark information, and the like acquired from a recording medium 60 via the recording medium I/F device 50

The communication device 40 conducts communications with a wired or wireless line. The communication device 40 acquires the contents, the digital watermark information such as the movie, the music, and the like from a server, and may store the contents, the digital watermark information, and the like into the auxiliary storage part 30.

The recording medium interface (I/F) device 50 interfaces between the recording medium 60 (such as flash memory or the like), which is connected through a data transmission channel such as a Universal Serial Bus (USB) or the like, and the information processing apparatus 1.

Moreover, a predetermined program is stored in the recording medium 60, and the predetermined program stored in the recording medium 60 is installed into the information processing apparatus 1 through the recording medium I/F device 50. Then, the installed predetermined program becomes possible to be executed by the information processing apparatus 1.

In a case in which the recording medium 60 is a SD card, the recording medium I/F device 50 is a SD card slot.
<Digital Watermark Information Embedding Function>

Figure 2:
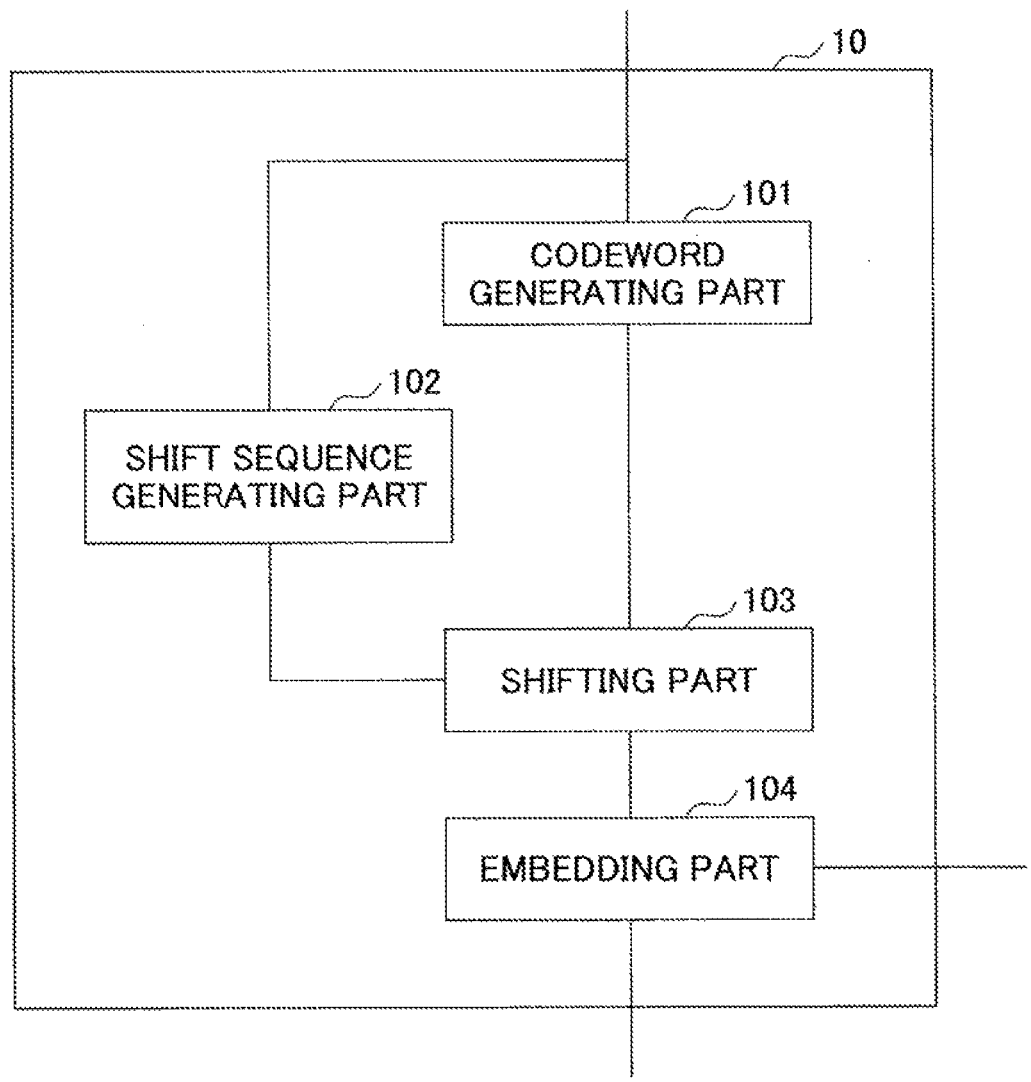
FIG. 2 is a block diagram illustrating an example of a function in a control device.

Next, the control device 10, which includes a digital watermark information embedding function, will be described in detail. FIG. 2 is a block diagram illustrating an example of the function in the control device 10. The control device 10 illustrated in FIG. 2 includes a codeword generating part 101, a shift sequence generating part 102, a shifting part 103, and an embedding part 104.

Figure 3:
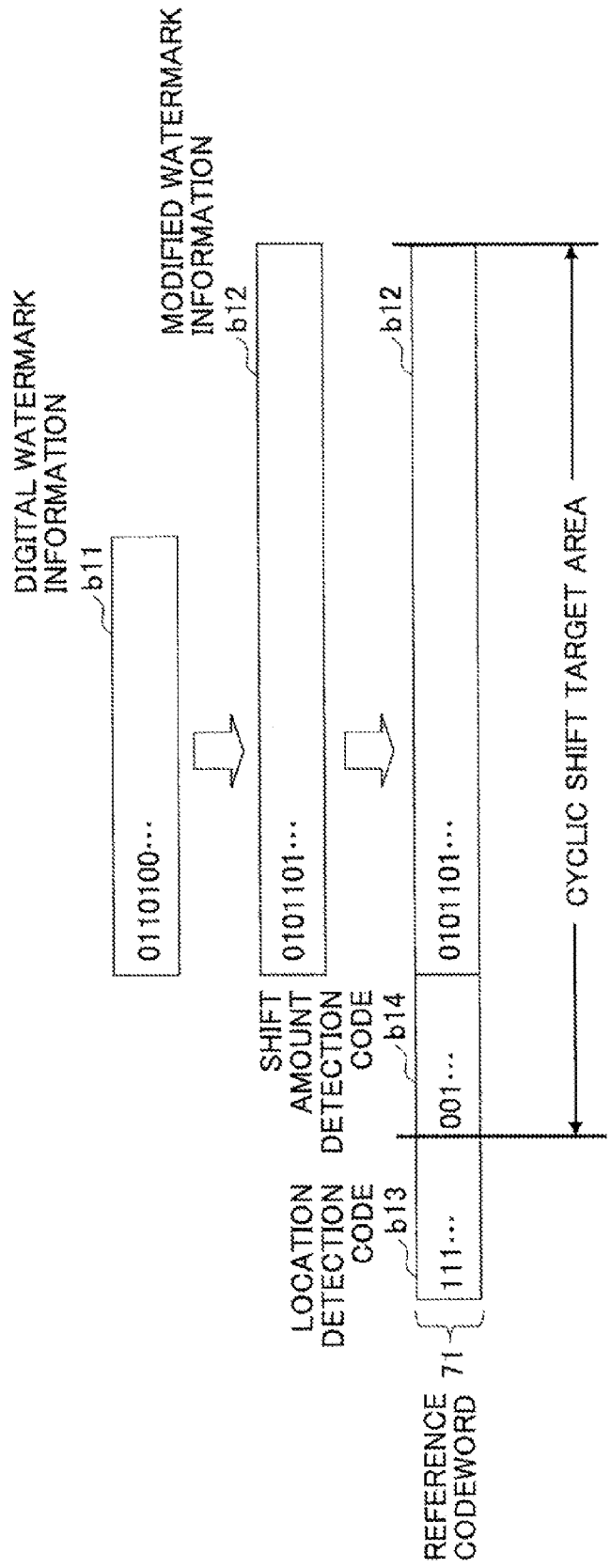
FIG. 3 is a diagram for explaining generation of a reference codeword.

The codeword generating part 101 generates a reference codeword including a bit sequence of digital watermark information b11 shown in FIG. 3. The reference codeword may be also called a "first codeword". The codeword generating part 101 acquires the digital watermark information from the communication device 40 or the auxiliary storage device 30. The reference codeword includes a location detection code, a shift amount detection code, and modified watermark information in which the digital watermark information is modified.

The location detection code is used to specify a location of a modified codeword. The shift amount detection code is used to specify a shift amount. In the modified watermark information, with respect to the digital watermark information, an error detection code and/or error correction code are added.

The shift sequence generating part 102 generates a cyclic shift sequence for the shift amount to be cyclically shifted by the shifting part 103. A process performed by the shift sequence generating part 102 will be described later with reference to FIG. 4.

The shifting part 103 generates the modified codeword by cyclically shifting a portion, in which the location detection code is excluded from the reference codeword acquired by the codeword generating part 101, by the shift amount corresponding to a cyclic shift sequence. The portion may correspond to the shift amount detection code and the modified watermark information. The modified codeword may be also called "second codeword".

Moreover, the shifting part 103 generates multiple modified codewords from one reference codeword for one set of contents. In this case, the shifting part 103 uses the shift amount of the cyclic shift sequence acquired from the shift sequence generating part 102, as the shift amount respective to each of multiple modified codewords.

The embedding part 104 embeds the modified codeword generated by the shifting part 103 into the contents targeted to embed the image, the sound, or the like. The contents are acquired from the auxiliary storage part 30 or the communication part 40. The embedding part 104 may use any one of various methods for embedding the digital watermark information depending on the contents, in order to embed the digital watermark information.

In a case in which the contents are sound data, the embedding part 104 embeds the modified codeword in a non-audible region. In this case, the embedding part 104 generates a signal respective to a value of a bit for each bit included in the modified codeword. Thus, the embedding part 104 sequentially superimposes the signal responsive to the value of each bit into the non-audible region of the sound data in accordance with a chronological order from a beginning bit in the modified codeword.

Moreover, in a case in which the contents are movie data, the embedding part 104 sequentially embeds bits one by one from the beginning bit in the modified codeword with respect to multiple images which are included in the movie data and arranged in the chronological order. The embedding part 104 sets a brightness value of an image at a predetermined location respective to each of the images to be a brightness value corresponding to a value of each bit from the beginning bit in the modified codeword. The predetermined location may be any one of bits at four corners in the image. Accordingly, in the embodiment, the method for embedding the digital watermark into the contents is not limited, and any one of various methods may be used.

<Detailed Process in Each Part>

Next, each of processes related to embedding the digital watermark will be described in detail.

<<Generation of Reference Codeword>>

FIG. 3 is a diagram for explaining generation of the reference codeword. In an example illustrated in FIG. 3, the digital watermark information, which is input into the codeword generating part 101, includes the copyright information of the target contents to be embedded, vender information, purchaser information, and the like. In the example illustrated in FIG. 3, the digital watermark information is coded to be a bit sequence. Hereinafter, the digital watermark information is referred as the digital watermark information b11.

The codeword generating part 101 converts the digital watermark information b11 being coded into the modified watermark information b12 in which the error correction and the error detection is performed. That is, the codeword generating part 101 calculates the error correction code and the error detection code with respect to the digital watermark information and generates the modified watermark information b12. The error detection code and the error correction code are used to detect and correct an error of code which is occurred when the digital watermark information being embedded is compressed and the collusion attack is received.

Cyclic Redundancy Checking (CRC) code may be used for the error detection code, and a Reed-Solomon code, a Low Density Parity Check (LDPC), or the like may be used for the error correction code. A reference codeword 71 may not include the error detection code and/or the error correction code.

Moreover, the codeword generating part 101 generates the reference codeword 71 by additionally providing the location detection code b13 and the shift amount detection code b14 at an beginning of the modified watermark information b12. The location detection code b13 indicates a location of a modified codeword 72 (FIG. 5), which will be described, in the contents where the digital watermark information is embedded. The shift amount detection code b14 is used for the digital watermark detecting apparatus to detect the shift amount in the modified codeword 72.

It is preferable to set the location detection code b13 and the shift amount detection code b14 as bit sequences having a predetermined amount and being orthogonal to each other in order for the digital watermark detecting apparatus to properly detect the location detection code and the shift amount detection code.

The location detection code b13 is set to "1111111100000000", and the shift amount detection code b14 is set to "0010111100001111". The location detection code b13 and the shift amount detection code b14 is not limited to be 16 bits, and may be 8 bits, 32 bits, or the like in which the location detection code b13 and the shift amount detection code b14 are orthogonal to each other.

In the above example, the location detection code b13 and the shift amount detection code b14 are orthogonal, since a bit "0" is regarded as a number "−1" and an inner product of 16 dimensional vectors results 0 (zero).

In the reference codeword 71, the modified watermark information b12 and the shift amount detection code b14 become a target to be cyclically shifted by the shifting part 103 which will be described later.

Before a codeword is generated, the codeword generating part 101 may encrypt the digital watermark information, perform a scramble process in which the bit sequence included in the digital watermark information is replaced by a predetermined block unit, or conduct a pre-process such as a spread spectrum. In this case, the codeword generating part 101 includes the digital watermark information to which the pre-process is conducted, into the reference codeword 71.

Moreover, in a case in which the digital watermark information is represented by a bit sequence being longer than a predetermined bit length, the codeword generating part 101 may divide the bit sequence by a predetermined bit length unit, and may generate the reference codeword 71 for each of divided bit sequences. The codeword generating part 101 outputs the reference codeword 71 to the shifting part 103.

<<Generation of Cyclic Shift Sequence>>

Figure 4:
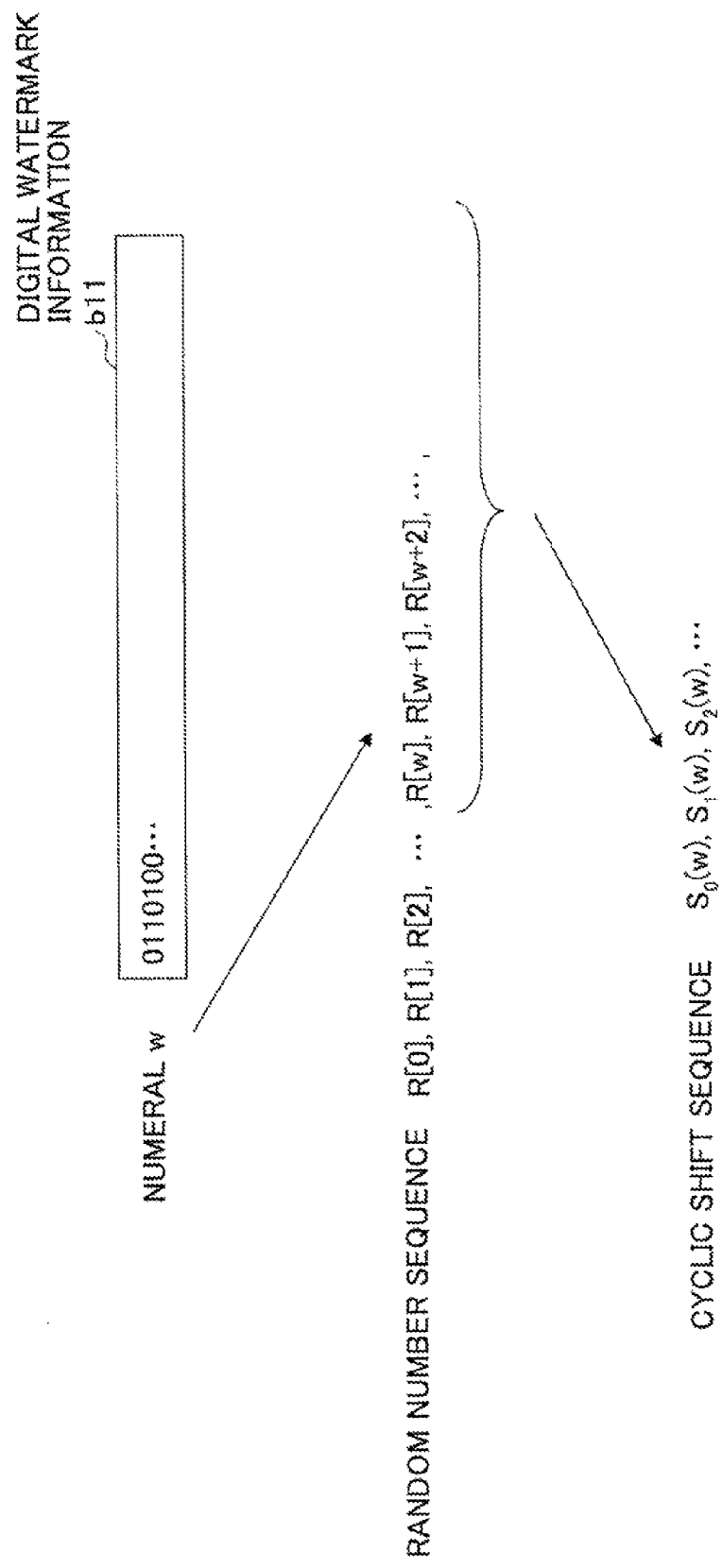
FIG. 4 is a diagram for explaining generation of a cyclic shift sequence.

FIG. 4 is a diagram for explaining the generation of the cyclic shift sequence. In an example illustrated in FIG. 4, the shift sequence, which is acquired from a numeral w represented by the digital watermark information b11 being the bit sequence, is expressed as the following function of w.

$$S(w)=S_0(w), S_1(w), S_2(w), \tag{1}$$

Each of elements $S_i(w)$ of the cyclic shift sequence $S(w)$ indicates a shift amount of the cyclic shift. The shifting part 103 performs the cyclic shift in a target area of the cyclic shift by using the shift amount. Hereinafter, the shift amount $S_i(w)$ is simply represented by $S_i$.

As an example of a method for generating the cyclic shift sequence $S(w)$, a method using pseudo-random numbers may be used. As the pseudo-random numbers to use, various methods such as linear congruential generators, Mersenne Twister, Advanced Encryption Standard (AES), and the like may be applied. A numeral is set to nw in a case of the entirety of the numeral w by the digital watermark information b11, and a value of a $t^{th}$ value in the pseudo-random numbers is indicated by R[t].

A random number sequence R[t] (t=0, 1, 2, . . . , w, . . . ) illustrated in FIG. 4 is generated by the pseudo-random numbers. With respect to the random number sequence R[t], when the numeral w is set to be a start location, the shift amount $S_i$ is represented by the following expression (2) where the numeral w is set to be a seed of a random number.

$$S_i=R[w+i] \tag{2}$$

For the sake of convenience, the numeral w of the digital watermark information b11 ranges from 0 (zero) to nw−1. Moreover, the random number sequence R[t] indicates a value smaller than a code length being a target of the cyclic shift. The shift sequence generating part 102 outputs a generated cyclic shift sequence $S_i$ to the shifting part 103.

<<Cyclic Shift>>

Figure 5:
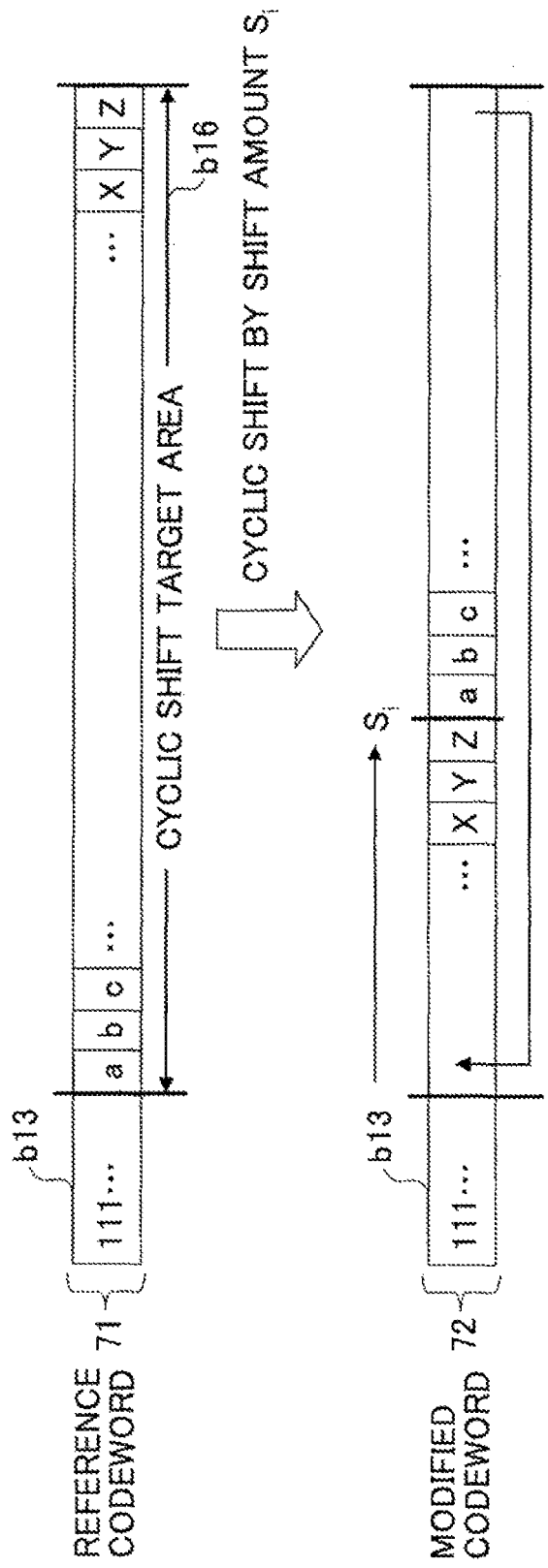
FIG. 5 is a diagram for explaining a cyclic shift.

FIG. 5 is a diagram for explaining the cyclic shift. In an example illustrated in FIG. 5, the cyclic shift is applied to a code area excluding the location detection code b13 located at the beginning of the reference codeword 71. The shift amount $S_i$ of the cyclic shift is set based on the cyclic shift sequence acquired from the shift sequence generating part 102.

The shift amount Si indicates an $i^{th}$ value in the cyclic shift sequence. As illustrated in FIG. 5, the shifting part 103 shifts bits "a", "b", and "c" at a left side of a cyclic shift target area toward a right side by the shift amount Si by the cyclic shift. The shifting part 103 moves and arranges bits such as bits "X", "Y", and "Z" at the right side, which are pushed outside a cyclic shift target area b16 after being shifted to right, at the left side in the cyclic shift target area b16.

The more a data amount of one set of contents the greater the number of the modified codewords 72 generated for the set of contents may be set. The number of the modified codewords 72 may be set to be a value resulted from dividing the data amount of the contents by a predetermined data amount for embedding one modified codeword 72. In a case in which the value exceeds a predetermined upper limit value, the shifting part 103 may set the upper limit value as the number of the modified codeword 72. The upper limit value may be 10. The shifting part 103 outputs one or more modified codewords 72 which are generated, to the embedding part 104.

<<Embedding Process>>

Figure 6:
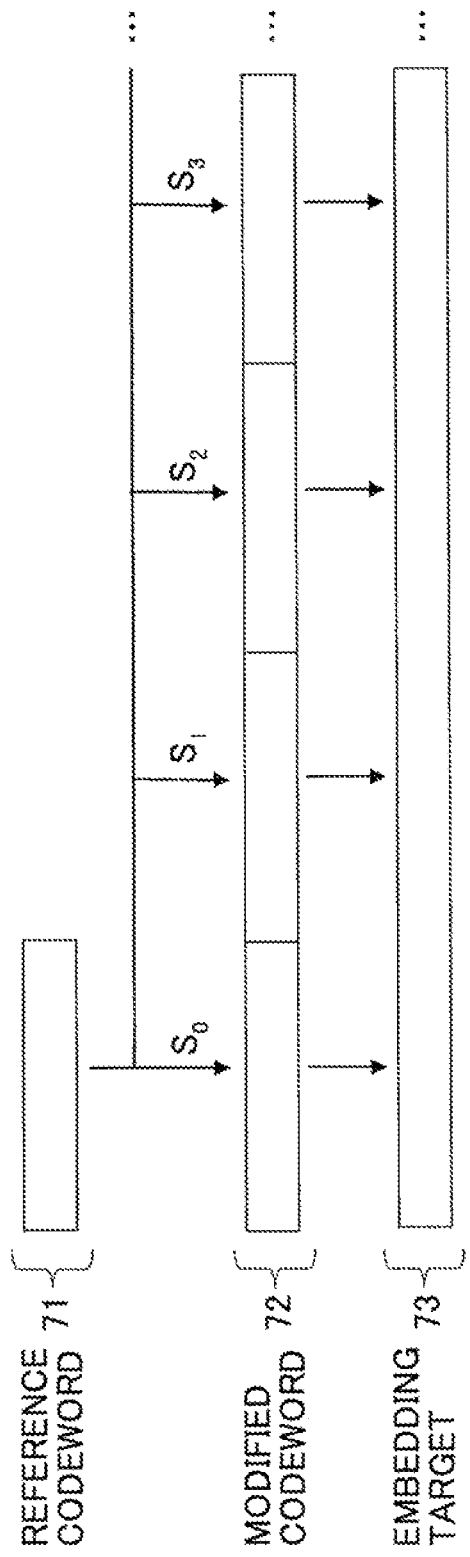
FIG. 6 is diagram for explaining a process for embedding a modified codeword to contents.

FIG. 6 is diagram for explaining a process for embedding the modified codeword 72 into the contents. In an example illustrated in FIG. 6, the shifting part 103 generates multiple modified codewords 72 by using the shift amount depending on a size of the contents being an embedding target.

The cyclic shift amount for the reference codeword 71 is set in an order $S_0, S_1, S_2, S_3$ . . . from the cyclic shift sequence generated by the shift sequence generating part 102 as illustrated in FIG. 6. The embedding part 104 embeds the multiple modified codewords 72 which are generated, into the contents by a predetermined embedding method.

Accordingly, it is possible to embed the modified codeword 72 being secure against the collusion attack and improving practicability into the contents of the embedding target.

<Operation>

Figure 7:
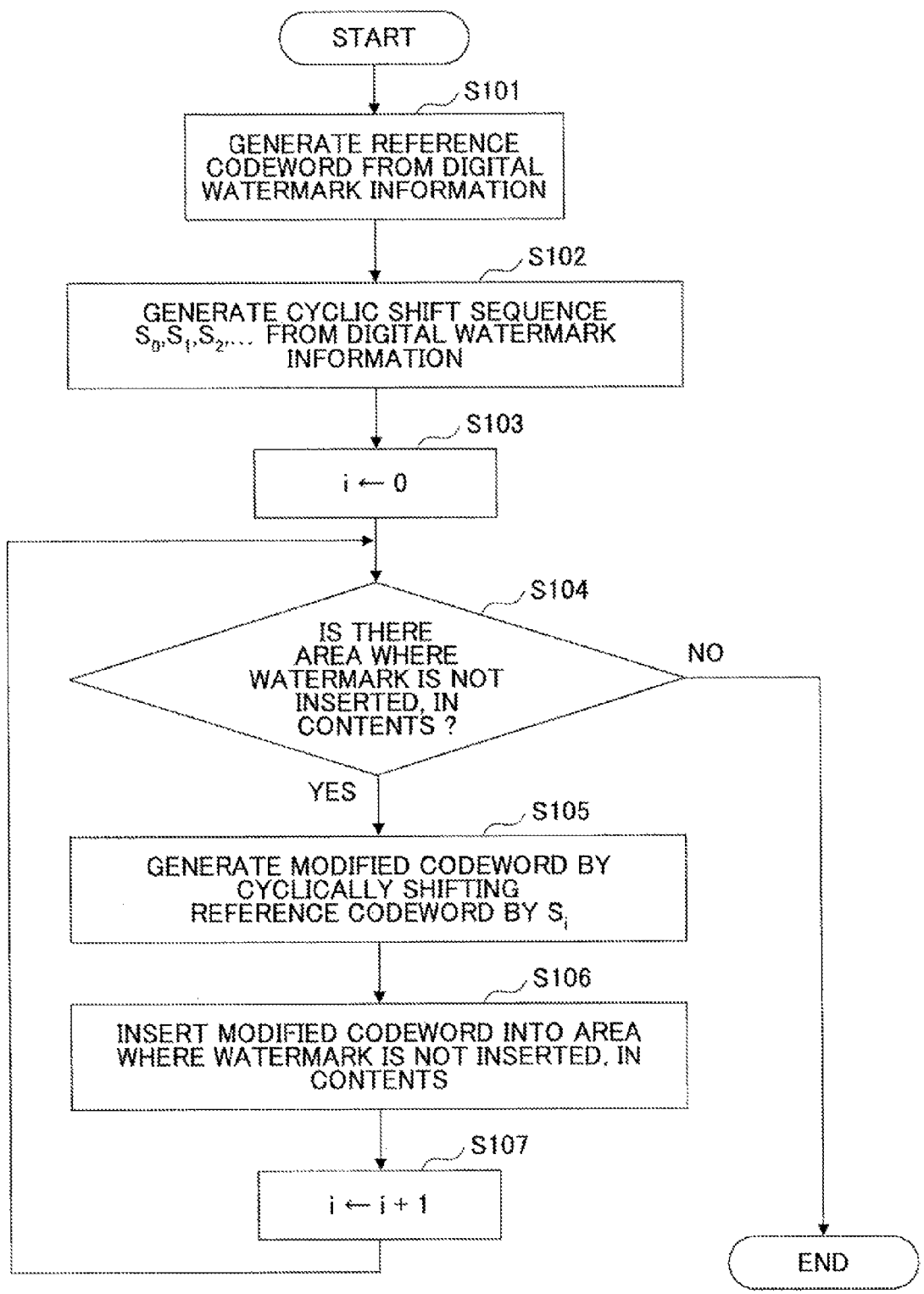
FIG. 7 is a flowchart for explaining an example of a digital watermark embedding process in a first embodiment.

Next, an operation of the digital watermark embedding apparatus will be described. FIG. 7 is a flowchart for explaining an example of a digital watermark embedding process in the first embodiment. In step S101 illustrated in FIG. 7, the codeword generating part 101 generates the reference codeword 71 from the digital watermark information. The reference codeword 71 includes the location detection code b13, the shift amount detection code b14, and the modified watermark information b12.

In step S102, the shift sequence generating part 102 generates the cyclic shift sequence $S_0, S_1, S_2, S_3, \ldots$ from the digital watermark information b11. The shift sequence generating part 102 sets a numeral indicated by the bit sequence of the digital watermark information b11 to be a start location with respect to the random number sequence, and determines the random number sequence from the start location as the cyclic shift sequence.

In step S103, the shifting part 103 sets an index i to 0. The index i indicates a repetition count for embedding the digital watermark.

In step S104, the shifting part 103 determines whether there is an area where the digital watermark is not inserted into the contents of the embedding target. When there is a non-inserted area (step S104-YES), the shifting part 103 advances to step S105. When there is no non-inserted area (step S104-NO), the shifting part 103 terminates this process.

The non-inserted area is regarded as an area where the modified codeword 72 has not been inserted and the modified codeword 72 may be inserted. As an example of the non-inserted area, in a case in which the contents are the sound data, the modified codeword 72 has not been embedded, and the non-audible region possible to superimpose the data amount of the modified codeword 72 is a non-inserted area. Moreover, when the contents are the movie data, the modified codeword 72 has not been embedded, and multiple images respective to a total count of bits included in the modified codeword 72 correspond to the non-inserted area.

In step S105, the shifting part 103 generates the modified codeword 72 by cyclically shifting the reference codeword 71 (specifically, codes excluding the location detection code from the reference codeword 71) by $S_i$.

In step S106, the embedding part 104 inserts the modified codeword 72 generated by the shifting part 103 into the non-inserted area.

In step S107, after a process of the step S106, the shifting part 103 increments the index i by one, and returns to a determination process of the step S104.

As described above, accordingly, it is possible to embed the digital watermark information being secure against the collusion attack and improving practicability into the contents of the embedding target.

[Second Embodiment]

Next, an information processing apparatus in the second embodiment will be described. The information processing apparatus in the second embodiment functions as the digital watermark detecting apparatus, and detects the digital watermark information which is embedded by the digital watermark embedding apparatus in the first embodiment.

<Configuration>

The information processing apparatus in the second embodiment is similar to the information processing apparatus 1 in the first embodiment, and the explanation thereof will be omitted. A configuration of the information processing apparatus in the second embodiment will be described with the same numeral numbers as those illustrated in FIG. 1.

<Digital Watermark Detection Function>

Figure 8:
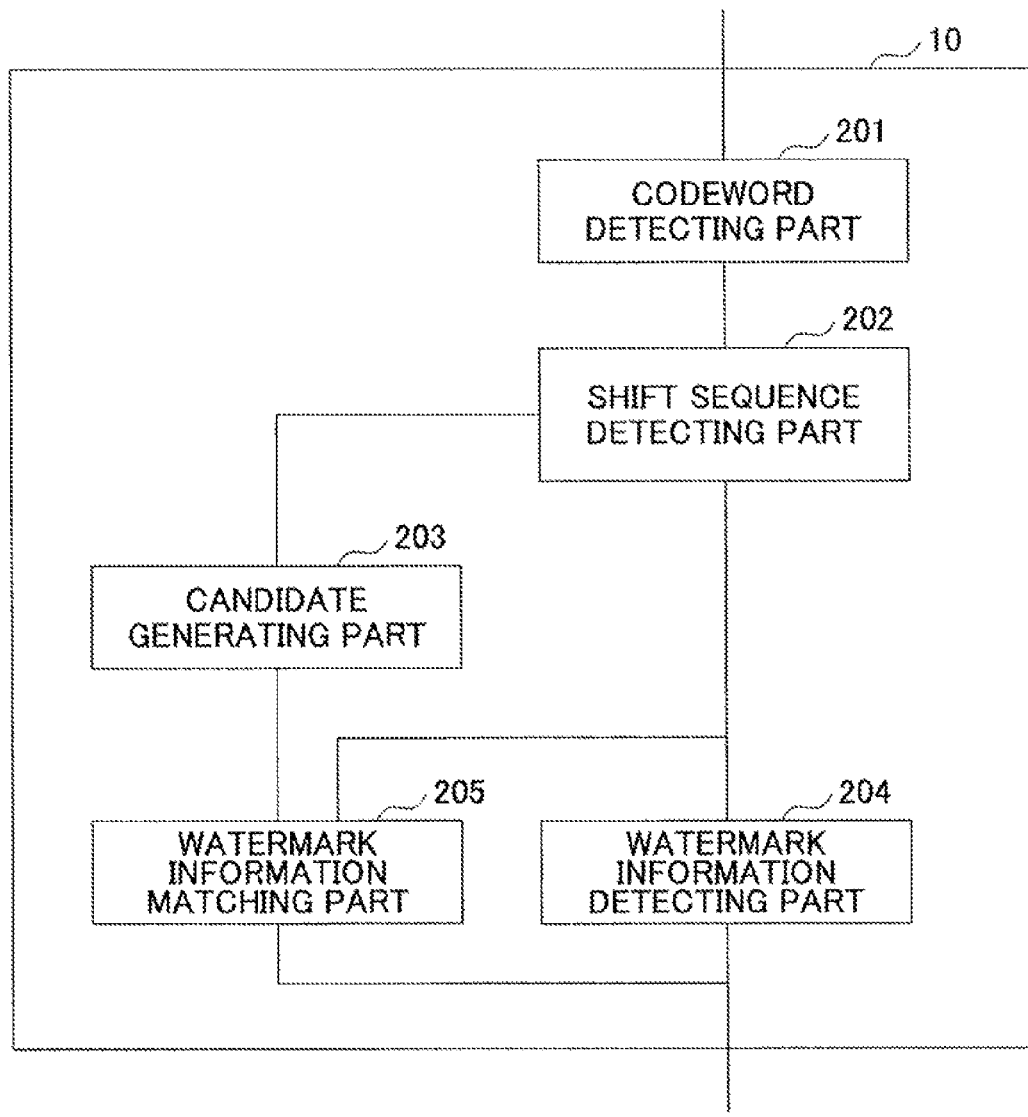
FIG. 8 is a block diagram illustrating an example of a digital watermark detection function in the control device.

Next, the control device 10 including a digital watermark detection function will be described in detail. FIG. 8 is a block diagram illustrating an example of a digital watermark detection function in the control device 10. The control device 10 illustrated in FIG. 8 includes a codeword detecting part 201, a shift sequence detecting part 202, a candidate generating part 203, a watermark information detecting part 204, and a watermark information matching part 205.

The codeword detecting part 201 detects the multiple modified codewords 72 which are embedded in the contents. The codeword detecting part 201 may detect each of bits of the multiple modified codewords 72 embedded in the contents, by using a detection method corresponding to the digital watermark embedding method described in the first embodiment.

It is assumed that the contents are the sound data, and that a signal (hereinafter, called additional signal) respective to a value of each of bits included in the multiple modified codewords 72 is additionally provided in the non-audible region of the sound data. In this case, the codeword detecting part 201 conducts a template matching in which a template corresponding to the additional signal is matched with a signal in the non-audible region, and detects the signal corresponding to the template in the non-audible region. The codeword detecting part 201 detects a bit value of the template to which the signal in the non-audible region corresponds, as a bit included in the modified codewords 72.

Moreover, in a case in which the contents are the movie data and a predetermined pixel in each of images has a value corresponding to bit values included in the multiple modified codewords 72, the codeword detecting part 201 detects the bit value corresponding the value of the predetermined pixel. The codeword detecting part 201 outputs the detected codeword as a first detection code to the shift sequence detecting part 202.

Figure 9:
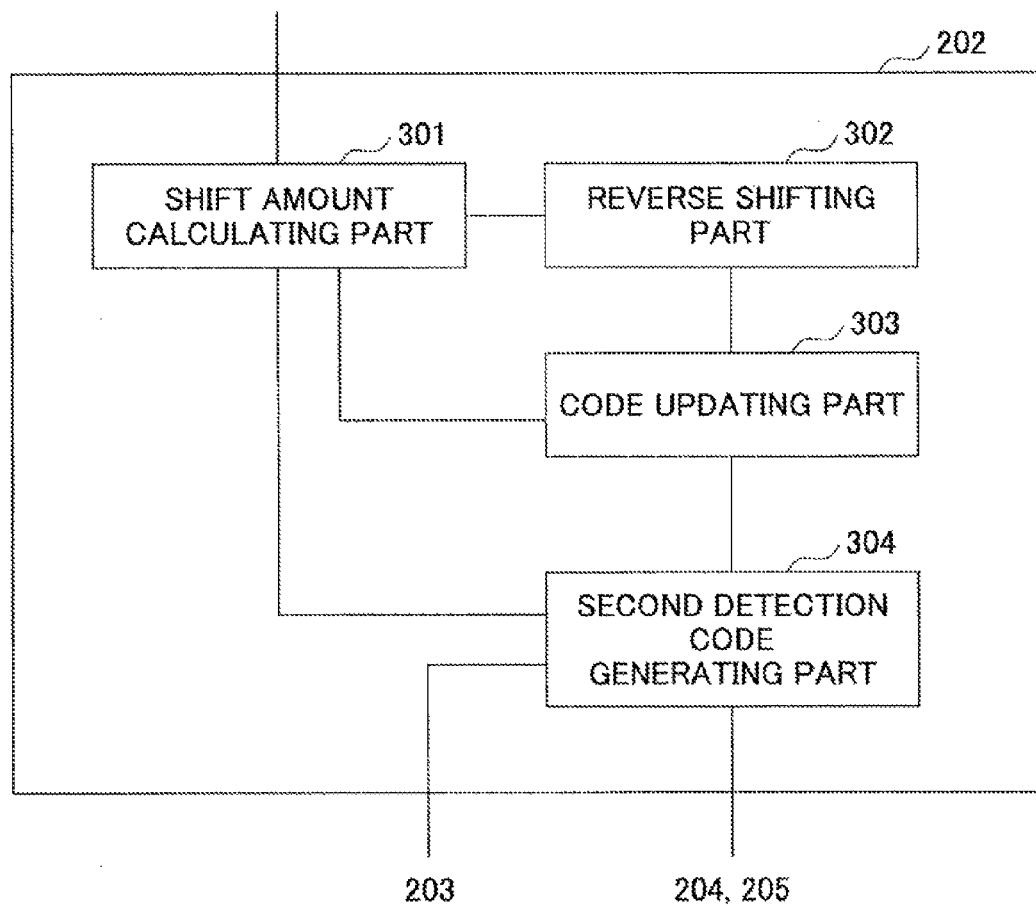
FIG. 9 is a block diagram illustrating an example of a configuration of a shift sequence detection part.

The shift sequence detecting part 202 will be described with reference to FIG. 9. FIG. 9 is a block diagram illustrating an example of a configuration of the shift sequence detecting part 202. The shift sequence detecting part 202 illustrated in FIG. 9 includes a shift amount calculating part 301, a reverse shifting part 302, a code updating part 303, and a second detection code generating part 304.

The shift amount calculating part 301 calculates a sequence (hereafter, may be called "shift sequence") of the shift amount by which the reference codeword 71 is cyclically shifted when the digital watermark is embedded, based on the first detection code acquired from the codeword detecting part 201. The shift amount calculating part 301 may calculate the shift amount by using a cross-correlation value with an other code in which a code in the first detection code is set as a reference.

The shift amount calculating part 301 sets a code (hereinafter, a "reference code"), which is a reference in a second calculation and following calculations of the shift amount, by a code updated by the code updating part 303.

The reverse shifting part 302 reversely shifts an other code, in which the cross-correlation value is calculated, by using the shift amount calculated by the shift amount calculating part 301. The other code acquired by a reverse shift is output to the code updating part 303.

The code updating part 303 updates a code by adding the other code acquired by the reverse shift and the reference code, so as to generate a new code. The above-described processes by shift amount calculation part 301, the reverse shifting part 302, and the code updating part 303 are performed for all codes other than the reference code.

When there are no other codes, the shift amount calculating part 301 generates the shift sequence by aligning multiple shift amounts being acquired, and outputs the generated shift sequence to the second detection code generating part 304. Moreover, the code updating part 303 outputs a final updated code to the second detection code generating part 304.

The second detection code generating part 304 generates a second detection code being a code for watermark detection based on the updated code acquired from the code updating part 303. The second detection code generating part 304 specifies a location of the shift amount detection code from the updated code, and reversely shifts the updated code so that the shift amount detection code is set to be at the beginning of the updated code.

The second detection code generating part 304 generates a code excluding the shift amount detection code from the reversely shifted code as the second detection code. The second detection code is regarded as a code corresponding to the modified watermark information. The second detection code generating part 304 outputs the second detection code to the watermark information detecting part 204 and the watermark information matching part 205.

Moreover, the second detection code generating part 304 updates the shift sequence acquired from the shift amount calculating part 301 by reversely shifting again for a reversely shifted amount. The second detection code generating part 304 outputs the updated shift sequence to the candidate generating part 203.

Referring back to FIG. 8, the candidate generating part 203 generates one or more candidates of the digital watermark information of a detection target, from the shift sequence acquired from the shift sequence detecting part 202. The candidate generating part 203 outputs the one or more generated candidates to the watermark information matching part 205.

The watermark information detecting part 204 detects and outputs watermark information embedded as the digital watermark information from the second detection code generated by the shift sequence detecting part 202. When the watermark information detecting part 204 does not detect a watermark, the watermark information matching part 205 tries to acquire optimum digital watermark information.

The watermark information matching part 205 calculates similarity between each of the candidates of the digital watermark information generated by the candidate generating part 203 and the second detection code, and outputs an optimum candidate from the candidates of the digital watermark information as the digital watermark information.

<Detailed Process of Each Part>

Next, each of processes in the digital watermark detection process will be described in detail.

<<Detection Process of First Detection Code>>

The first detection code corresponding to the watermark is detected from the contents in which the digital watermark information is embedded. A process for detecting the first detection code conducted in accordance with the detection method which corresponds to the above-described embedding method performed by the embedding part 104 in the first embodiment. The detection method may correspond to the embedding method by the embedding part 104, and thus, is not limited to a specific process.

The first detection code corresponds to a code in which the modified codeword 72, which is generated when the digital watermark is embedded, is repeatedly aligned by a different shift amount. The contents, in which the digital watermark is embedded, may be degraded through a data compression, a filter process, a video capture, a collusion attack, and the like. Accordingly, the first detection code, which is detected from the degraded contents, does not always correspond to a code generated when the digital watermark is embedded, and may include an error.

<<Detection Process of Cyclic Shift Sequence and Second Detection Code>>

The shift sequence detecting part 202 calculates the shift amounts respective to the multiple modified codewords 72 repeatedly generated when the digital watermark is embedded, from the first detection code. The shift sequence detecting part 202 also generates the second detection code used for watermark detection, from the first detection code. The shift sequence, in which each of the calculated shift amounts is aligned, corresponds to the cyclic shift sequence.

Figure 10:
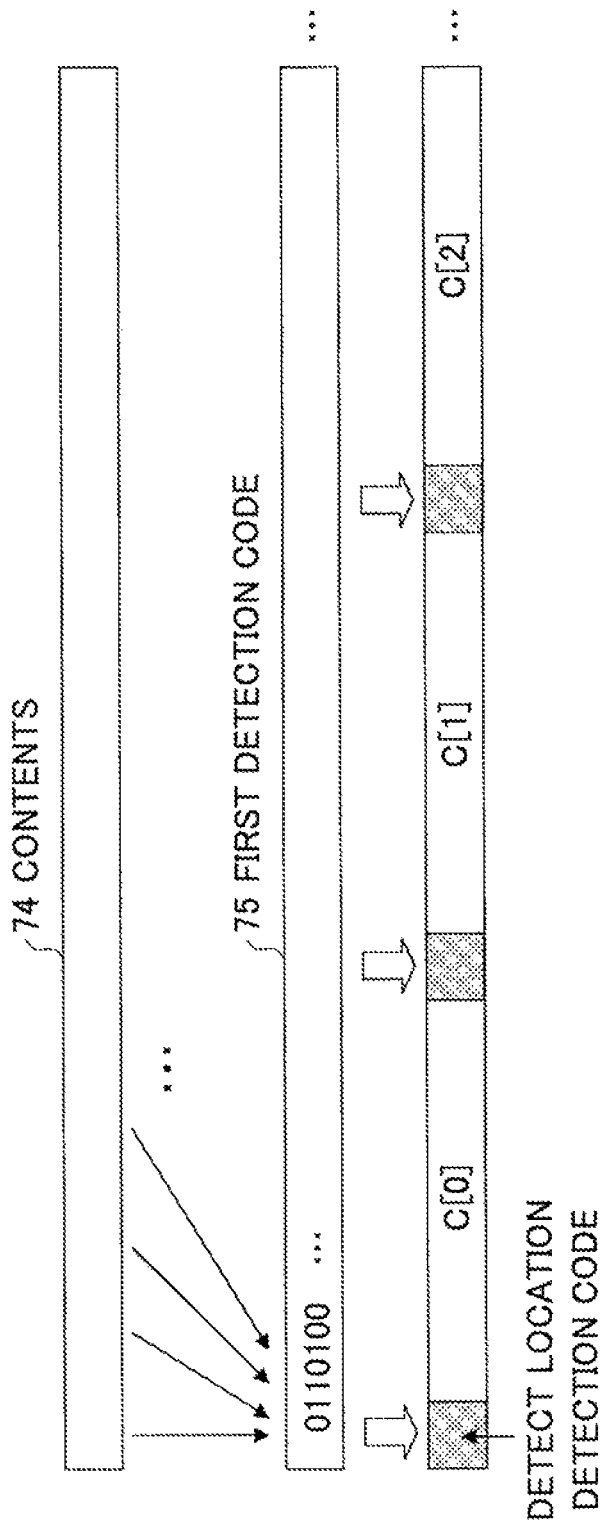
FIG. 10 is a diagram for explaining detection of a code from the contents.

FIG. 10 is a diagram for explaining code detection based on the contents. In an example illustrated in FIG. 10, the codeword detecting part 201 detects the first detection code from contents 74. Next, the shift sequence detecting part 202 detects a code used to detect the cyclic shift sequence and the second detection code from the first detection code. This code is indicated by C[i]. The code used to detect the second detection code includes C'[i] and C*[i] which will be described later.

The code C[i] is acquired by detecting the location detection code by the shift amount calculating part 301. The location detection code represents a beginning location of each of the multiple modified codewords 72. Accordingly, the shift amount calculating part 301 recognizes that a code following each of the location detection codes placed at a location where a respective modified codeword 72 is cyclically shifted.

In the following, a process, which generates the cyclic shift sequence and the second detection code by using each of C[i], will be described. Each of C[i] is acquired by cyclically shifting the reference codeword 71 by a different shift amount. Accordingly, in a case in which the shift amount calculating part 301 calculates the cross-correlation value between two codes in C[i], the cross-correlation value becomes maximum at a portion corresponding to a difference of the cyclic shift amount between the two codes.

Accordingly, by calculating the cyclic shift amount in which the cross-correlation value between a code C[0] and a code C[i] other than C[0] becomes the maximum, the shift amount calculating part 301 acquires a relative shift sequence S[0], S[1], and S[2] in which the code C[0] is set as a reference.

In this case, S[0] indicates the cross-correlation value between the code C[0] and the code C[0] itself, that is, the cyclic shift value in which an autocorrelation value of the code C[0] is the maximum, and is always 0 (zero). Next, a calculation method of the cross-correlation value will be described. Bit 0 is corresponded to c[i][k]=−1 and bit 1 is corresponded to c[i][k]=1, where N indicates the number of the modified codewords 72, M indicates a code length of C[i] (the code length is the same length for any i), and c[i][k] indicates bit information of $k^{th}$ of C[i] (0≤k≤(M−1)).

Moreover, C'[i] indicates a code sequence in which C[i] is reversely shifted by S[i] by the reverse shifting part 302, and C'[i][k] indicates $k^{th}$ bit information of C'[i]. Furthermore, C*[i] represents the code sequence in which codes from C[0] to C[i] are added by the code updating part 303 at locations where the cross-correlation value is maximum. Also, C*[i][k] indicates the $k^{th}$ bit information in C*[i].

In this case, a cross-correlation value between C*[i−1] and C[i] in which C[i] is cyclically shifted only by j is set to be r[i][j], and the following iterative calculation is conducted.

<1> Initialization $$C^*[0] = C[0] \quad (3)$$

$$S[0] = 0 \quad (4)$$

<2> The following expressions (5) through (8) are repeated in a range of i=1 to N−1.

$$r[i][j] = \sum_{k=0}^{M-1} c^*[i-1][k]c[i][(k+j)\% M] \quad (5)$$

$$(0 \leq j < M)$$

$$S[i] = \underset{0 \leq j \leq M-1}{\mathrm{argmax}}(r[i][j]) \quad (6)$$

$$c[i][j] = c[i][(j + S[i])\% M] \quad (7)$$

$$(0 \leq j < M - 1)$$

$$C^*[i] = C^*[i-1] + C'[i] \quad (8)$$

In the expressions (5) and (7), "%" indicates a remainder operator, "A % B" indicates a remainder acquired by dividing A by B. Also, "argmax" in the expression (6) indicates a function which returns an index where r[i][j] is maximum to S[i] when j is varied from 0 to M−1.

Furthermore, calculations by the expressions (3) and (8) are conducted in each of elements of C[i], C'[i], and C*[i]. By these iterative calculations, a code sequence C*[N−1] is acquired in which the cyclic shift sequence S[i] and each C[i] are accumulated by positioning to a location where the cross-correlation value is maximum. The cyclic shift sequence S[i] indicates relative values from C[0] being set as the reference.

Figure 11:
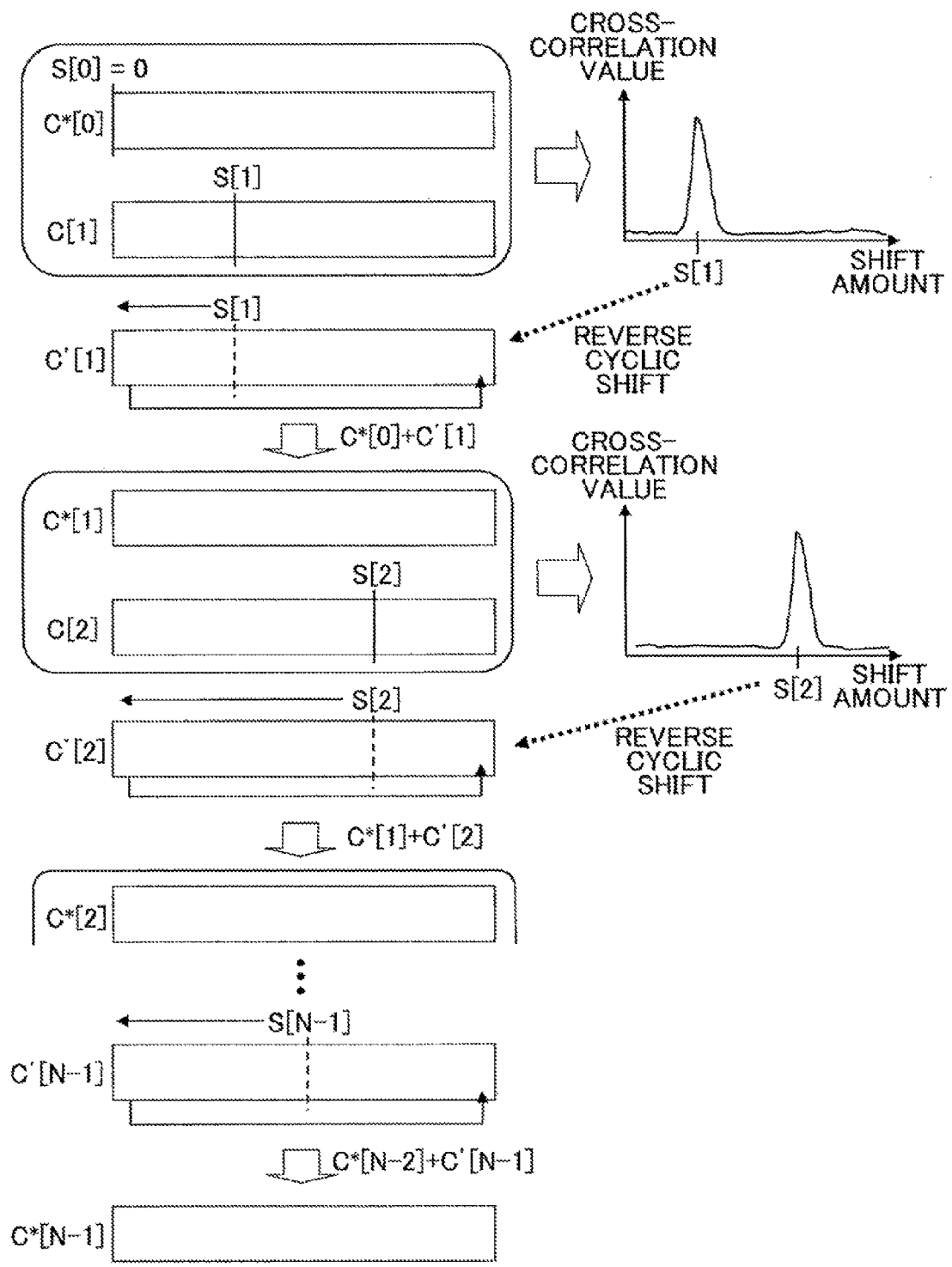
FIG. 11 is a diagram for explaining detection of a shift sequence.

FIG. 11 is a diagram for explaining detection of the shift sequence. In an example illustrated in FIG. 11, landscape rectangles at right sides of C[i], C'[i], and C*[i] represent bit sequences for respective codes. The bit sequence may be also called the "code sequence".

In an example illustrated in FIG. 11, first, the shift amount calculating part 301 calculates S[1] corresponding to the difference of the cyclic shift amount of C*[0] and C[1] as the cross-correlation value by using the expression (6). As illustrated in FIG. 11, referring to a graph of the shift amount and the cross-correlation value, a peak of the cross-correlation value appears at the shift amount S[1].

The reverse shifting part 302 conducts the reverse cyclic shift for C[1] by S[1] by using the expression (7), and generates C'[1]. Next, the code updating part 303 acquires C*[1] by C*[1]=C*[0]+C'[1] by using the expression (8).

As illustrated in FIG. 11, the shift sequence detecting part 202 generates a code sequence C*[N−1], in which C[i] is accumulated by positioning at a location of the peak of the cross-correlation value, by repeating processes of the expressions (5) through (8). The code sequence C*[N−1] is used to detect the second detection code. Each of elements C*[N−1][k] of C*[N−1] indicates a result from adding the bit information at the same location of the reference codeword 71 in a state before the cyclic shift is performed.

Figure 12:
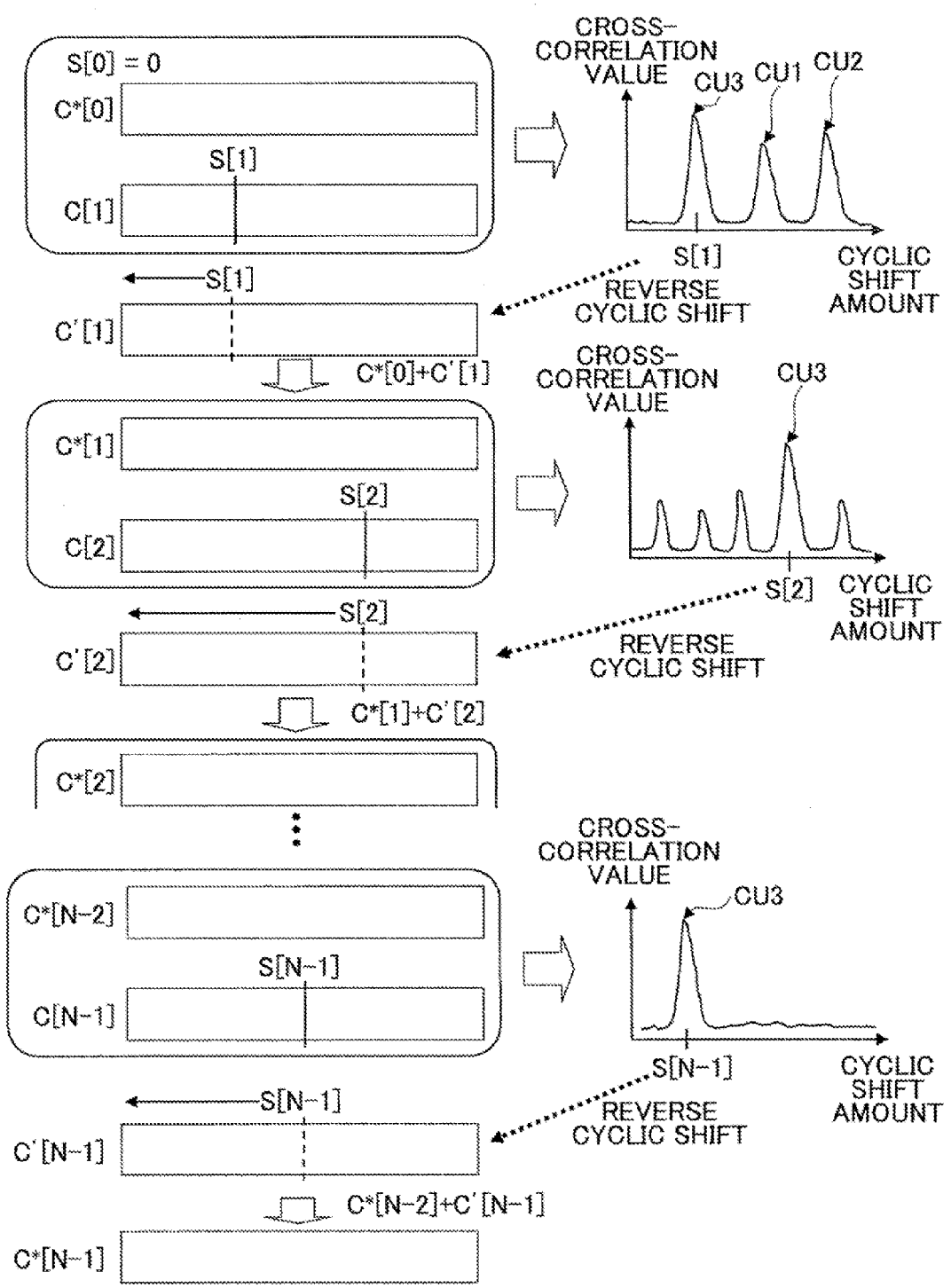
FIG. 12 is a diagram for explaining the detection of the shift sequence in the contents to which three colluding users conduct a collusion attack.

FIG. 12 is a diagram for explaining a detection of the shift sequence in the contents 74 to which the collusion attack is conducted by three colluding users CU1, CU2, and CU3. As illustrated in FIG. 12, first, the shift amount calculating part 301 calculates S[1] corresponding to the difference of the cyclic shift amount between C*[0] and C[1] by using the expression (6), as the cross-correlation value.

In this case, as illustrated in FIG. 12, an amount of the cyclic shift is different for each of three colluding users CU1, CU2, and CU3. When the cross-correlation value is calculated between C*[0] and C[1], three peaks appear in response to three colluding users CU1, CU2, and CU3.

As illustrated in FIG. 12, the cross-correlation value of the cyclic shift amount corresponding to the colluding user CU3 becomes maximum and C*[1] is generated by positioning at the cyclic shift location of the colluding user CU3. The C*[1] indicates the code sequence in which the cyclic shift location is positioned at the code location corresponding to the colluding user CU3 by the reverse cyclic shift of C*[1] and C*[0] is added. Accordingly, the code sequence of the colluding user CU3 is emphasized.

On the other hand, since values are added in a random location relationship in the code sequences corresponding to the colluding users CU1 and CU2, noises are randomly applied to the code sequences and greatness of the cross-correlation value reduced. Accordingly, when the cross-correlation value between C*[1] and C[2] is further calculated, the peak of the cross-correlation value corresponding to the cyclic shift amount of the colluding user CU3.

In an example illustrated in FIG. 12, the processes of the expressions (5) through (8) are repeated by the shift sequence detecting part 202. In the code sequence C*[N−1] acquired by an add calculation, the code sequence of the colluding user CU3 is further emphasized, and noises are further randomly applied to the colluding users CU1 and CU2 and weakened.

If one code sequence alone is used, since each set of digital watermark information is damaged, it is difficult to detect the digital watermark information. Accordingly, when multiple code sequences are added by using the cross-correlation value by the above-described method, the digital watermark information of one specific colluding user in the multiple colluding users is emphasized. Therefore, it is possible to restore the damaged digital watermark information and to detect the digital watermark information from the code which receives the collusion attack.

Accordingly, it is possible for the shift sequence detecting part 202 to acquire the shift sequence S[i] by the expression (6), and to acquire the code C*[N−1] used to detect the second detection code by the expression (8).

Figure 13:
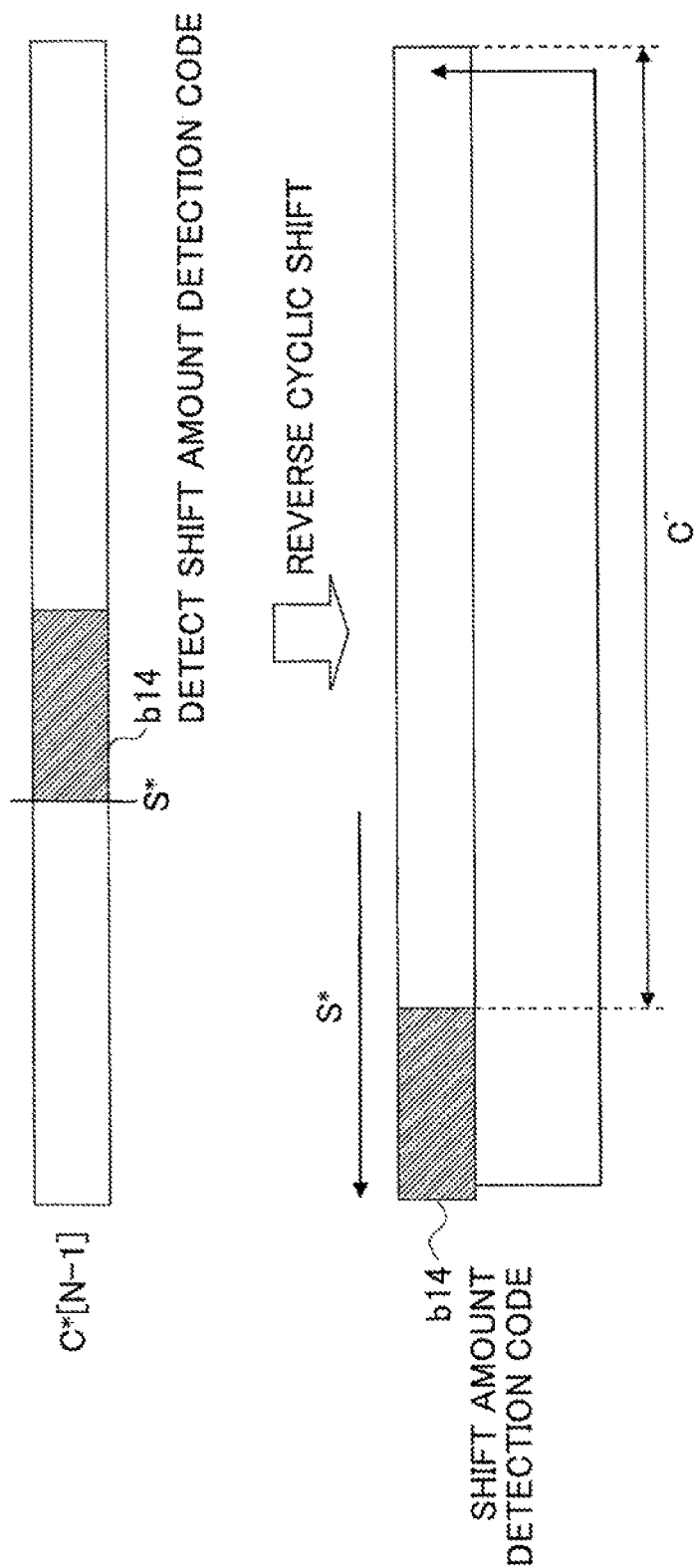
FIG. 13 is a diagram for explaining generation of a second detection code.

Next, a process for generating the second detection code will be described. FIG. 13 is a diagram for explaining generation of the second detection code. First, the second detection code generating part 304 detects a shift amount detection code b14 indicating the shift amount of the reference codeword 71 from the code sequence C*[N−1], and reversely and cyclically shifts C*[N−1] to position the shift amount detection code b14 at the beginning location. In an example illustrated in FIG. 13, S* indicates a displacement from the beginning location of the shift amount detection code b14 in C*[N−1].

The second detection code generating part 304 acquires the second detection code by excluding the shift amount detection code b14 from the code sequence which is acquired by performing the reverse cyclic shift with respect to C*[N−1]. After that, as illustrated in FIG. 13, C^ is used as a symbol indicating the second detection code.

A generation procedure of the second detection code C^ will be described by the following expressions. When L indicates a code length of the shift amount detection code b14, c^[i] indicates $i^{th}$ element of the second detection code, c^[i] is calculated by the following expressions (9) through (10).

$$tmp[i] = c^*[N-1][(i+L+S^*)\% M] \quad (9)$$
$$(0 \le i < M - L)$$

$$c^\wedge[i] = \begin{cases} 1 & \text{if } tmp[i] > 0 \\ -1 & \text{otherwise} \end{cases} \quad (10)$$
$$(0 \le i < M - L)$$

Moreover, in response to the reverse cyclic shift in generating the second detection code, each of S[i] is also updated by being shifted to left by S* by the following expression (11).

$$S[i] \leftarrow (S[i] + S^*) \% M \quad (11)$$

By the above-described procedure, the second detection code generating part 304 acquires the second detection code and the shift sequence S[i].

<<Generation of Watermark Information Candidates>>

Next, generation of watermark information candidates will be described with reference to FIG. 14. FIG. 14 is a diagram for explaining the generation of the watermark information candidates. The candidate generating part 203 generates candidates of the digital watermark information being a detection target based on the shift sequence S[i] acquired by the shift sequence detecting part 202.

As illustrated in FIG. 14, the candidate generating part 203 prepares a random number sequence which is the same sequence generated by the shift sequence generating part 102 in the first embodiment. Next, the candidate generating part 203 searches for a portion matched with the shift sequence in the random sequence. The candidate generating part 203 may determine that the shift sequence and the random number sequence at a predetermined location correspond to each other when the similarity of the shift sequence and the random sequence is greater than or equal to a predetermined value.

When a portion corresponding to the shift sequence is found, the digital watermark information corresponding to a location of the found portion is generated as a watermark candidate. In an example illustrated in FIG. 14, the watermark candidates are represented by w[0] through w[$N_w$−1]. In an example illustrated in FIG. 14, $N_w$ sequences of the watermark candidates are generated.

The candidate generating part 203 converts the watermark candidate w[i] into a modified watermark code W[i] in accordance with the same steps as the codeword generating part 101 of the first embodiment, in order for the watermark information matching part 205 which will be described to match with the second detection code C". The candidate generating part 203 outputs the modified watermark candidate W[i] to the watermark information matching part 205.

<<Detection of Watermark Information>>

The watermark information detecting part 204 detects the digital watermark information based on the second detection code detected by the shift sequence detecting part 202. The second detection code corresponds to the modified watermark information b12 generated by the codeword generating part 101 in the digital watermark embedding process, and is acquired by converting original digital watermark information into a format possible for the error correction and the error detection.

Accordingly, the watermark information detecting part 204 conducts a reverse conversion by applying the error correction and the error detection with respect to the second detection code. The watermark information detecting part 204 detects the code sequence being reversely converted as the digital watermark information, when it is determined that there is no error found in an error detection process. After that, the watermark information detecting part 204 terminates the watermark detection process. On the other hand, when the error is found, the watermark information detecting part 204 informs the watermark information matching part 205 that the error is found.

<<Matching of Digital Watermark Information>>

The watermark information matching part 205 acquires the similarity between the second detection code C^ and each of the modified watermark codes W[i] (watermark candidates w[i]) of the digital watermark information, which are generated by the candidate generating part 203, and outputs the optimum candidate from the watermark candidates w[i] of the digital watermark information.

The watermark information matching part 205 sets the bit information of a $j^{th}$ element of W[i] to w[i][j], and acquires a similarity sim[i] between W[i] and C^ by an expression (12) for a cross-correlation value calculation.

$$sim[i] = \frac{\sum_{j=0}^{M-L-1} c^{\wedge}[j]w[i][j]}{M-L} \quad (12)$$

The watermark information matching part 205 calculates the similarity sim[i] for each of the digital watermark information candidates by using the expression (12). The watermark information matching part 205 selects the digital watermark information candidate having a maximum similarity in the multiple digital watermark information candidates. When a certain condition is satisfied such that the maximum similarity is greater than a threshold, the watermark information matching part 205 detects the digital watermark information. Since a value of "0" is set to be "−1" in the second detection code C^, a value of "−1" is set back to "0" in the detected digital watermark information.

Accordingly, even in a case in which there is an error in the second detection code and it is not possible to correct the error, by generating the digital watermark information candidates from the shift sequence, it is possible to improve detection accuracy of the digital watermark information. Therefore, it is possible to provide a digital watermark technology in which the digital watermark is more secured and practicality is improved.

<Operation>

Figure 15:
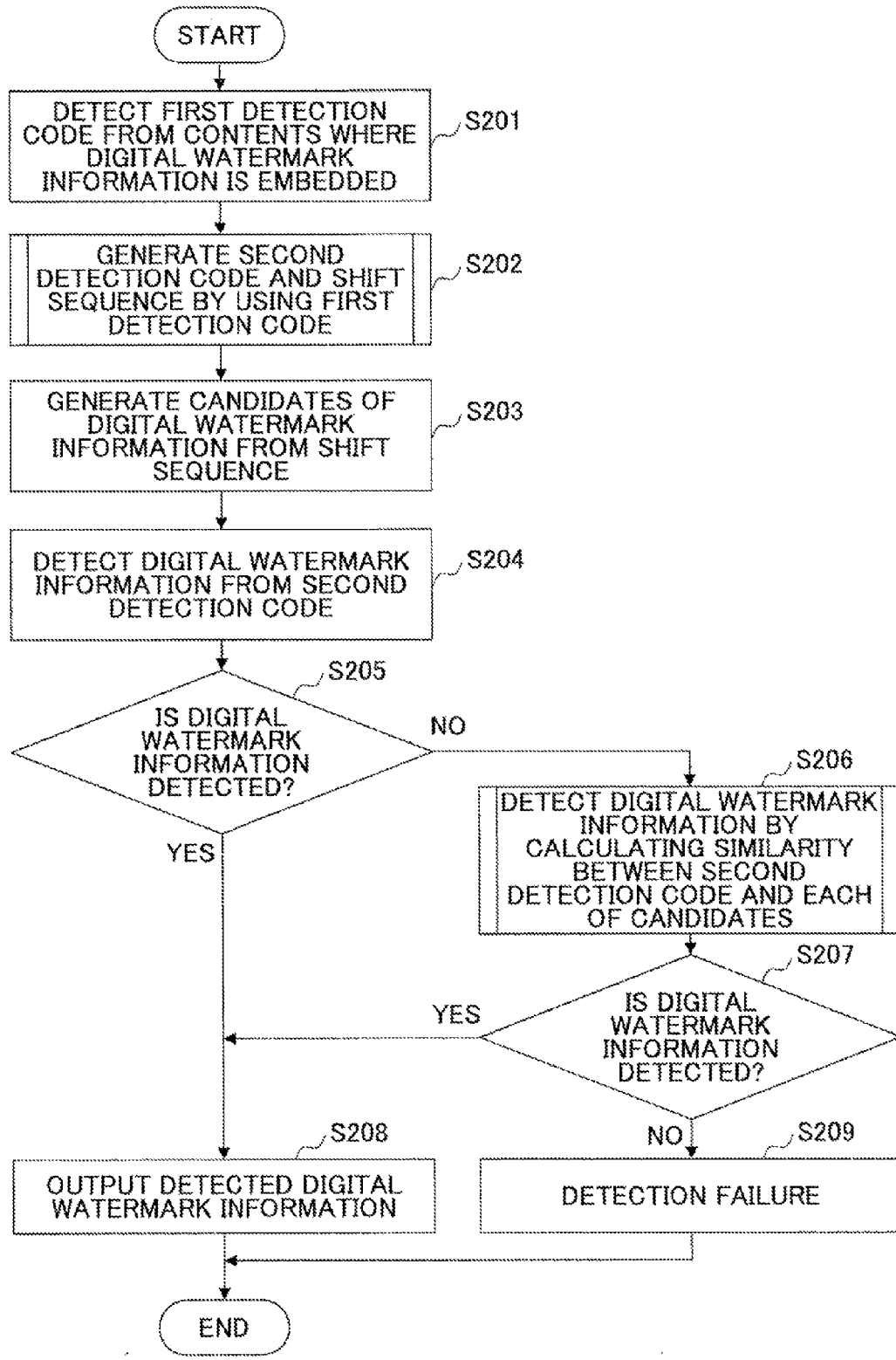
FIG. 15 is a flowchart for explaining an example of a digital watermark detection process in a second example.

Next, an operation of the information processing apparatus in the second embodiment will be described. FIG. 15 is a flowchart for explaining an example of the digital watermark detection process in the second embodiment. In step S201 illustrated in FIG. 15, the codeword detecting part 201 detects the first detection code corresponding to the digital watermark information from the contents 74 in which the digital watermark information is embedded.

In step S202, the shift sequence detecting part 202 generates the second detection code for a watermark detection from the first detection code detected in step S201 and the shift sequence indicating the shift amount with respect to each of the modified codewords 72. A detailed process in step S202 will be described later with reference to FIG. 16A and FIG. 16B.

In step S203, the candidate generating part 203 generates the digital watermark information candidates by using the shift sequence generated by the shift sequence detecting part 202.

In step S204, the watermark information detecting part 204 conducts a reverse conversion by applying the error correction and the error detection with respect to the second detection code generated by the shift sequence detecting part 202, and attempts to detect the digital watermark information.

In step S205, the watermark information detecting part 204 determines whether the digital watermark information is detected. When the digital watermark information is detected (step S205-YES), the watermark information detecting part 204 advances to step S208. On the other hand, when the digital watermark information is not detected (step S205-NO), the watermark information detecting part 204 advances to step S206.

In step S206, the watermark information matching part 205 acquires the similarity between the second detection code and each of the digital watermark information candidates, and detects the optimum candidate in the digital watermark information candidates as the digital watermark information.

In step S207, the watermark information matching part 205 determines whether the digital watermark information is detected. When the digital watermark information is detected (step S207-YES), the watermark information matching part 205 advances to step S208. On the other hand, when the digital watermark information is not detected (step S207-NO), the watermark information matching part 205 advances to step S209.

In step S208, the watermark information detecting part 204 or the watermark information matching part 205 outputs the detected digital watermark information.

In step S209, the watermark information matching part 205 determines that detection of the digital watermark information has failed. Detailed processes in steps S206 through S209 will be described later with reference to FIG. 17.

By the above-described processes, it is possible to properly detect the digital watermark information embedded in the digital watermark embedding process of the first embodiment.

Figure 16A:
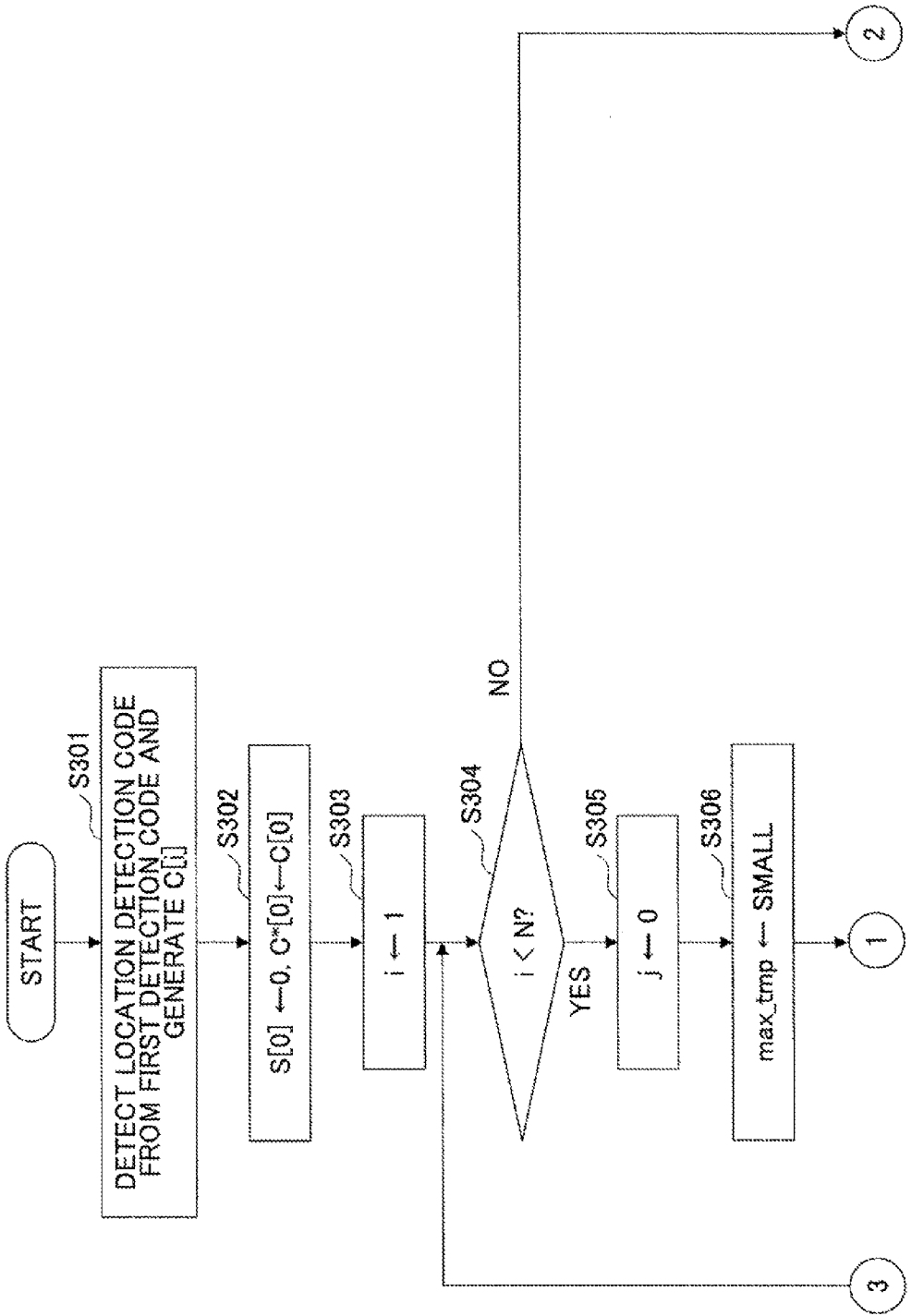
FIG. 16A and FIG. 16B are flowcharts for explaining an example of a process conducted by a shift sequence detection part.
Figure 16B:
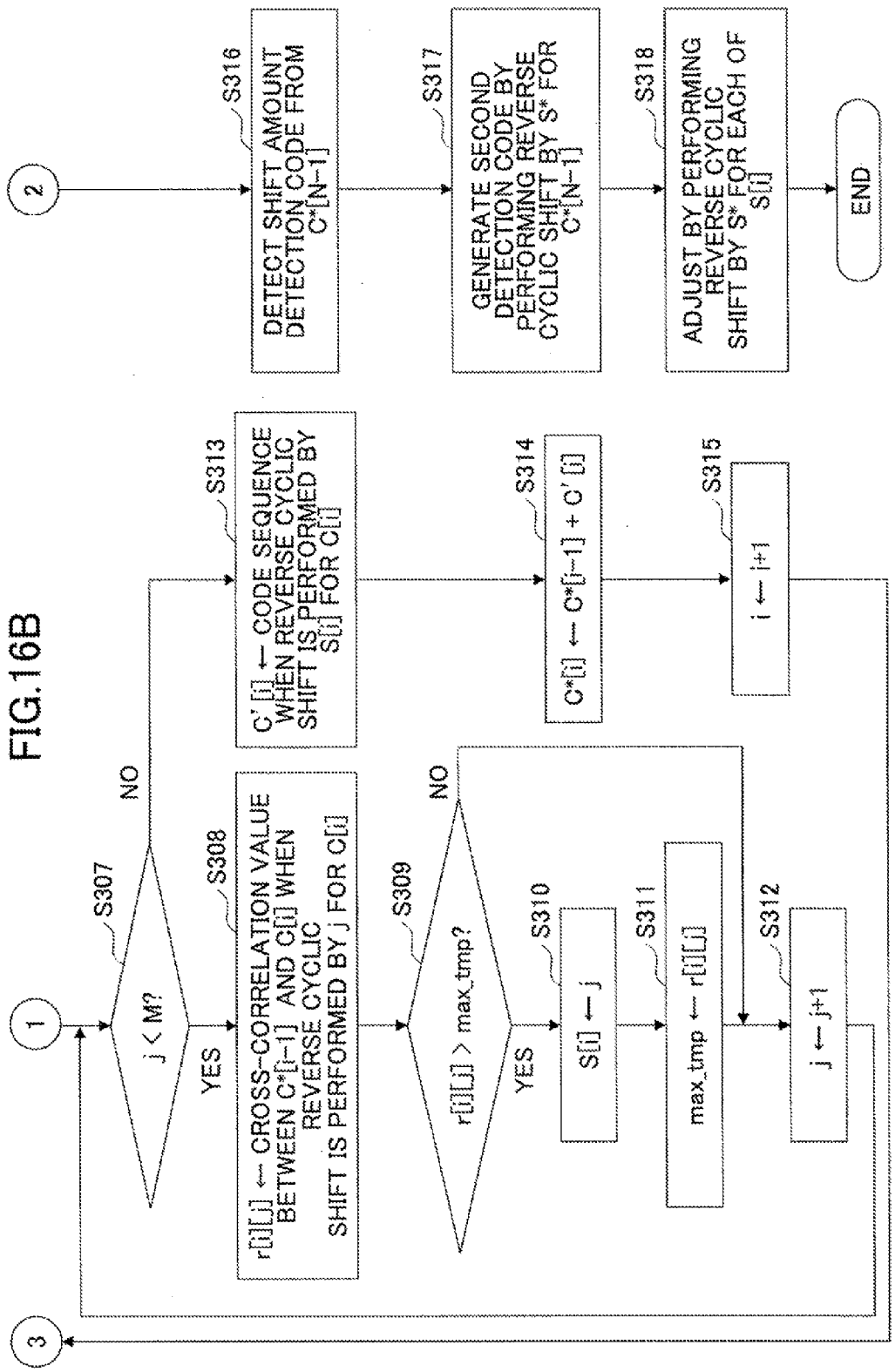

FIG. 16A and FIG. 16B are flowcharts for explaining an example of a process of the shift sequence detecting part 202. Variables, which are used without explanations in the flowchart illustrated in FIG. 16A and FIG. 16B, are the same as those previously described above.

In step S301, the shift amount calculating part 301 detects the location detection code from the first detection code, specifies the beginning location for each of the modified codewords 72, and generates C[i].

In step S302, since the cyclic shift value S[0] having the maximum cross-correlation value of C[0] always indicates 0 (zero), the shift amount calculating part 301 sets S[0] to 0 beforehand, and sets C*[0] to C[0].

In step S303, the shift amount calculating part 301 sets a loop variable i corresponding to C[i] to 1.

In step S304, the shift amount calculating part 301 determines whether the loop variable i is smaller than N. When the loop variable i is smaller than N (step S304-YES), the shift amount calculating part 301 advances to step S305. On the other hand, when the loop variable i is greater than or equal to N (step S304-NO), the shift amount calculating part 301 advances to step S316.

In step S305, the shift amount calculating part 301 determines a loop variable j corresponding to the shift amount to be 0 (zero).

In step S306, the shift amount calculating part 301 sets a variable max_tmp representing a current maximum value of the cross-correlation value, to a value SMALL which is smaller than possible values of the cross-correlation value beforehand.

In step S307, the shift amount calculating part 301 determines whether the loop variable j is smaller than a code length M of C[i]. When the loop variable j is smaller than M (step S307-YES), the shift amount calculating part 301 advances to step S308. On the other hand, when the loop variable j is greater than or equal to M (step S307-NO), the shift amount calculating part 301 advances to step S313.

In step S308, the shift amount calculating part 301 calculates the cross-correlation value r[i][j] between C*[i−1] and C[i] in a case in which C[i] is cyclically shifted by j, by the expression (5).

In step S309, the shift amount calculating part 301 determines that the calculated value r[i][j] is greater than the value max_tmp. When the value r[i][j] is greater than the max_tmp (step S309-YES), the shift amount calculating part 301 advances to step S310. On the other hand, when the value r[i][j] is smaller than or equal to the value max_tmp (step S309-NO), the shift amount calculating part 301 advances to step S312.

In step S310, the shift amount calculating part 301 sets S[i] to j. In step S311, the shift amount calculating part 301 substitutes r[i][j] into the variable max_tmp. In step S312, the shift amount calculating part 301 increments j by 1, and goes back to a process of the step S307.

In step S313, the reverse shifting part 302 substitutes the code sequence, in which C[i] is reversely and cyclically shifted by S[i] by using the expression (7), into C'[i].

In step S314, the code updating part 303 updates the code sequence C*[i], which is accumulated by positioning C[i] at a location where the cross-correlation value becomes maximum. In step S315, the code updating part 303 increments i by 1, and goes back to a process of the step S304.

In step S316, the second detection code generating part 304 detects the shift amount detection code b14 from C*[N−1].

In step S317, the second detection code generating part 304 reversely and cyclically shifts C*[N−1] by the shift amount S* alone, and generates the second detection code positioned after the shift amount detection code b14.

In step S318, the second detection code generating part 304 reversely and cyclically shifts each S[i] by S*, and generates the shift sequence S[i] in which the shift amount detection code b14 is set as the reference.

By the above-described processes, since the second detection code and the shift sequence are generated, it is possible to use the second detection code and the shift sequence for the digital watermark detection process which will be conducted later.

FIG. 17 is a flowchart for explaining an example of a process of the watermark information matching part 205. In step S401 illustrated in FIG. 17, the watermark information matching part 205 sets the index of a similarity calculation, i to 0 (zero).

In step S402, the watermark information matching part 205 sets the maximum value max_tmp of the similarity to 0 (zero).

In step S403, the watermark information matching part 205 determines whether the index i is less than $N_w$ where $N_w$ indicates a candidate count of the digital watermark information candidates W[i]. When the index i is less than $N_w$ (step S403-YES), the watermark information matching part 205 advances to step S404. On the other hand, when the index i is greater than or equal to $N_w$ (step S403-NO), the watermark information matching part 205 advances to step S409.

In step S404, the watermark information matching part 205 calculates the similarity between W[i] and C^ (sim[i]) by the expression (12).

In step S405, the watermark information matching part 205 determines whether the similarity sim[i] is greater than the variable max_tmp. When the similarity sim[i] is greater than the variable max_tmp (S405-YES), the watermark information matching part 205 advances to step S406. When the similarity sim[i] is less than or equal to the variable max_tmp (S405-NO), the watermark information matching part 205 advances to step S408.

In step S406, the watermark information matching part 205 substitutes i to the i_max used as an index to indicate the maximum sim[i].

In step S407, the watermark information matching part 205 substitutes a value of sim[i] to the variable max_tmp.

In step S408, the watermark information matching part 205 increments the variable i by 1, and goes back to step S403.

In step S409, the watermark information matching part 205 determines whether the maximum similarity sim[i_max] is greater than or equal to threshold sim_thre used to determine whether the digital watermark information is detected. This process corresponds to the step S207 illustrated in FIG. 15.

When the maximum similarity sim[i_max] is more than or equal to the threshold sim_thre (step S409-YES), the watermark information matching part 205 advances to step S410. When the maximum similarity sim[i_max] is less than the threshold sim_thre (step S409-NO), the watermark information matching part 205 advances to step S411.

In step S410, the watermark information matching part 205 outputs W[i_max] as the digital watermark information. This process corresponds to step S208 illustrated in FIG. 15.

In step S411, the watermark information matching part 205 determines that the detection of the digital watermark information is failed. This process corresponds to the step S209 illustrated in FIG. 15.

In the process for detecting the digital watermark information, in order to prevent the digital watermark information from being erroneously detected by the similarity calculation, threshold sim_thre may be defined. In a case in which the shift sequence S[i] is not accurately acquired by the shift sequence detecting part 202, a completely irrelevant sequence is generated based on the second detection code C^, and it is impossible to acquire proper digital watermark information by the watermark information matching part 205.

In this case, any similarity for each of the digital watermark information candidates is smaller. However, the digital watermark information candidate having the maximum similarity is calculated. When the digital watermark information is selected based on the maximum similarity alone, erroneous detection occurs. The threshold sim_thre is set to prevent the erroneous detection. A value of the threshold sim_thre for preventing the erroneous detection is preferably between 0.75 and 0.80

As described above, according to the second embodiment, it is possible to detect the digital watermark information embedded in the digital watermark embedding process in the first embodiment.

[Variation]

Programs realizing the digital watermark embedding process and the digital watermark detection process, which are described above, are recorded onto a recording medium. The recording medium may be formed by a non-transitory (or tangible) computer-readable recording medium. It is possible for a computer to perform the digital watermark embedding process in the first embodiment and the digital watermark detection process in the second embodiment. The programs may be recorded to the recording medium. The computer or a mobile terminal may be caused to read out the programs stored in the recording medium, and the digital watermark embedding process and the digital watermark detection process which are described above may be realized.

Various types of recording media may be used. The recording medium may be a Compact Disk Read-Only Memory (CD-ROM), a flexible disk, a magnetic optical disk, or the like which optically, electrically, or magnetically records information. Also, the recording medium may be a semiconductor memory, or the like which electrically records information such as a Read-Only Memory (ROM), a flash memory, or the like.

The programs executed in the information processing apparatus 1 realize a module configuration in which each of parts 101 through 104 and 201 through 205 described in the first and second embodiments are formed in the information processing apparatus 1. In an actual hardware configuration, the control device 10 reads out the programs from the auxiliary storage device 30 and executes the programs, so that one or more parts 101 through 104 and 201 through 205 described above are loaded to the main memory 20. One or more parts 101 through 104 and 201 through 205 described above are generated in the main memory 20.

As a related art, there is a coding method to conceptually secure detection accuracy of the digital watermark information in a case of encountering the collusion attack. In this technology, the code length becomes too long to embed the digital watermark into the movie data and the sound data. Thus, this technology is impractical. Moreover, in a case in which the contents 74 targeted for the watermark detection, even though it is possible to detect the digital watermark with shorter code length, a longer code is unnecessarily provided.

In another related art, data are coded by using a different key for each user. Therefore, in a case in which the user is unknown when the digital watermark is detected, the detection is attempted by each of keys. In a viewpoint of process efficiency, the second technology may be impractical.

However, according to the above-described embodiments, it is possible to provide the digital watermark embedding apparatus and method, and the digital watermark detecting apparatus and method, in which the digital watermark is secured more and practicality is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital watermark embedding apparatus, comprising:
a codeword generation part configured to generate a first codeword including a bit sequence of digital watermark information;
a shift sequence generation part configured to generate a cyclic shift sequence based on the digital watermark information;
a shifting part configured to generate a second codeword by cyclically shifting a part of the first codeword based on the cyclic shift sequence generated by the shift sequence generation part; and
an embedding part configured to embed the second codeword in contents.

2. The digital embedding apparatus as claimed in claim 1, wherein the shift sequence generation part determines a start location of a random number sequence by the bit sequence of the digital watermark information, and sets the cyclic shift sequence to be the sequence which begins from the start location in the random number sequence.

3. The digital watermark embedding apparatus as claimed in claim 2, wherein
the shifting part repeats a process which generates the second codeword by cyclically shifting the first codeword, each shift amount of which is set by the random number sequence in turns, and
the embedding part which embeds the second codeword generated in accordance with the sequence formed by the random sequence into the contents until an end of the contents.

4. The digital watermark embedding apparatus as claimed in claim 1, wherein the first codeword is formed by adding a location detection code to detect a start location of the second codeword and a shift amount detection code to detect a shift amount of the digital watermark information.

5. A digital watermark embedding method performed in a computer, the method comprising:
generating, by the computer, a first codeword including a bit sequence of digital watermark information;
generating, by the computer, a cyclic shift sequence based on the digital watermark information;
generating, by the computer, a second codeword by cyclically shifting a part of the first codeword based on the cyclic shift sequence; and
embedding, by the computer, the second codeword in contents.

6. A digital watermark detecting apparatus, comprising:
a codeword detection part configured to detect, from contents of a watermark detection target, a first detection code including multiple second codewords each of which is generated by cyclically shifting a first codeword, which includes digital watermark information, by using a cyclic shift sequence generated based on the digital watermark information;
a shift sequence detection part configured to perform a process for detecting, with respect to one second codeword, multiple shift amounts by calculating a cross-correlation value in response to a cyclic shift to other second codewords, and for updating the one second codeword by accumulating the other second codewords, which are reversely shifted by the shift amount, and the one second codeword, in which the process is conducted for each of the other second codewords;
a candidate generation part configured to generate digital watermark information candidates from a shift sequence in which the multiple shift amounts are aligned; and
a matching part configured to detect the digital watermark information embedded in the contents based on similarity between each of the digital watermark information candidates and the one accumulated second codeword which is generated in the shift sequence detection part.

7. The digital watermark detecting apparatus as claimed in claim 6, wherein
when the cyclic shift sequence is the number sequence which is generated by the apparatus of claim 2, the candidate generation part sets a bit sequence representing a numeral at a location where the similarity between the shift sequence and the random number sequence is greater than or equal to a predetermined value.

8. The digital watermark detecting apparatus as claimed in claim 6, wherein the shift sequence detection part includes
- a shift amount calculation part configured to calculate, with respect to the one second codeword, the shift amount based on the cross-correlation value acquired in response to the cyclic shift to the other second codewords;
- a reverse shift part configured to reversely shift the other second codewords by the shift amount calculated by the shift amount calculation part;
- a code updating part configured to accumulate a reversely shifted code and the one second codeword;
- a second detection code configured to correspond to the first codeword based on the one second codeword accumulated by the code updating part; and
- a second detection code generation part configured to generate the shift sequence aligning the multiple shift amounts.

9. A digital watermark detecting method performed in a computer, the method comprising:

detecting, by the computer, from contents of a watermark detection target, a first detection code including multiple second codewords each of which is generated by cyclically shifting a first codeword, which includes digital watermark information, by using a cyclic shift sequence generated based on the digital watermark information;

performing, by the computer, a process for detecting, with respect to one second codeword, multiple shift amounts by calculating a cross-correlation value in response to a cyclic shift to other second codewords, and for updating the one second codeword by accumulating the other second codewords, which are reversely shifted by the shift amount, and the one second codeword, in which the process is conducted for each of the other second codewords;

generating, by the computer, digital watermark information candidates from a shift sequence in which the multiple shift amounts are aligned; and detecting, by the computer, the digital watermark information embedded in the contents based on similarity between each of the digital watermark information candidates and the one accumulated second codeword which is generated in the shift sequence detection part.

* * * * *